(12) United States Patent
Moses et al.

(10) Patent No.: US 8,768,104 B2
(45) Date of Patent: Jul. 1, 2014

(54) HIGH VOLUME EARTH OBSERVATION IMAGE PROCESSING

(75) Inventors: Robert Moses, Chelsea (CA); David Stanley, Ottawa (CA); Louis Burry, Ottawa (CA); Richard Pollock, Aurora (CA)

(73) Assignee: PCI Geomatics Enterprises Inc. (CA)

( * ) Notice: Subject to any disclaimer, the term of this patent is extended or adjusted under 35 U.S.C. 154(b) by 939 days.

(21) Appl. No.: 12/349,959

(22) Filed: Jan. 7, 2009

(65) Prior Publication Data

US 2009/0232349 A1 Sep. 17, 2009

(30) Foreign Application Priority Data

Jan. 8, 2008 (CA) ..................................... 2617119

(51) Int. Cl.
*G06K 9/00* (2006.01)
*G06K 9/36* (2006.01)
*G06K 9/54* (2006.01)
*G06K 9/60* (2006.01)

(52) U.S. Cl.
USPC ..... 382/305; 382/100; 382/284; 707/E17.018

(58) Field of Classification Search
None
See application file for complete search history.

(56) References Cited

U.S. PATENT DOCUMENTS

| | | | | |
|---|---|---|---|---|
| 6,107,961 | A * | 8/2000 | Takagi ..................... | 342/357.64 |
| 6,125,329 | A * | 9/2000 | Place et al. ........................ | 702/5 |
| 6,480,627 | B1 * | 11/2002 | Mathias et al. ............... | 382/224 |
| 6,711,594 | B2 * | 3/2004 | Yano et al. ........................... | 1/1 |
| 7,154,538 | B1 * | 12/2006 | Fukasawa et al. ......... | 348/211.3 |
| 7,676,788 | B1 * | 3/2010 | Ousterhout et al. .......... | 717/106 |
| 8,472,664 | B1 * | 6/2013 | Jing et al. ...................... | 382/100 |
| 2003/0051188 | A1 * | 3/2003 | Patil ................... | 714/4 |
| 2004/0103208 | A1 * | 5/2004 | Chung et al. .................. | 709/236 |
| 2004/0148390 | A1 * | 7/2004 | Cleary et al. .................. | 709/224 |
| 2004/0215659 | A1 * | 10/2004 | Singfield et al. ............ | 707/104.1 |
| 2005/0007625 | A1 | 1/2005 | Garcia ......................... | 358/1.15 |
| 2005/0050292 | A1 * | 3/2005 | Oh ................... | 711/170 |
| 2005/0268300 | A1 | 12/2005 | Lamb et al. ................... | 718/100 |
| 2006/0031833 | A1 * | 2/2006 | Huang et al. .................. | 717/178 |
| 2006/0279628 | A1 * | 12/2006 | Fleming ........................ | 348/143 |
| 2007/0076016 | A1 * | 4/2007 | Agarwala et al. ............ | 345/629 |
| 2008/0077560 | A1 * | 3/2008 | Comi et al. ...................... | 707/3 |

(Continued)

OTHER PUBLICATIONS

Chinese Office Action issued in corresponding Chinese Patent Application Serial No. 200910003173.8 dated Mar. 22, 2012, with English translation (14 pgs).

(Continued)

*Primary Examiner* — Michelle Entezari
(74) *Attorney, Agent, or Firm* — Hayes Soloway P.C.

(57) ABSTRACT

The present invention is related to the processing of data, and more particularly to a method of and system for processing large volumes of Earth observation imagery data. A system for processing a large volume of Earth observation imaging data is described, comprising a computer including a visual display and a user interface, a plurality of servers, an image database storing said Earth observation imaging data as a plurality of separate image data files, and a network for interconnecting the computer, plurality of servers and image database. The plurality of servers is operable to process the separate data files in a distributed manner, at least one of the plurality of servers is operable to process the separate data files in a multiprocessing environment and at least one of the plurality of servers is operable to collate the processed separate data files into a single imaging result.

36 Claims, 7 Drawing Sheets

(56) References Cited

U.S. PATENT DOCUMENTS

| | | | |
|---|---|---|---|
| 2008/0077635 A1* | 3/2008 | Sporny et al. | 707/204 |
| 2008/0120619 A1* | 5/2008 | Podila | 718/102 |
| 2008/0174593 A1* | 7/2008 | Ham et al. | 345/418 |
| 2009/0034725 A1* | 2/2009 | Davies et al. | 380/255 |
| 2009/0141020 A1* | 6/2009 | Freund et al. | 345/419 |

OTHER PUBLICATIONS

Chinese Office Action issued in corresponding Chinese Patent Application Serial No. 200910003173.8 dated Nov. 1, 2012, with English translation (18 pgs).

Chinese Office Action issued in corresponding Chinese Patent Application Serial No. 200910003173.8 dated Apr. 28, 2013, with English translation (7 pgs).

* cited by examiner

HIGH VOLUME EARTH OBSERVATION IMAGE PROCESSING

FIELD OF THE INVENTION

The present invention is related to the processing of data, and more particularly to a method of and system for processing large volumes of Earth observation imagery data.

BACKGROUND TO THE INVENTION

Earth observation imagery data has been collected and analysed for decades and is an essential part of many natural resource management, geological and mineral exploration, agricultural management, environmental monitoring and aerial mapping systems, to name just a few applications. Whether the data is obtained from satellite, airborne sensing or other systems, and whether it consists of all or a combination of photogrammetry, hyperspectral, multitemporal, optical, thermal and microwave (and other similar systems) data, the problem with analysis is much the same: large volumes of data must be processed quickly and accurately, without distortion.

For example, remote sensing has been a central tool for environmental management and monitoring at local, regional and global scales. The need to monitor the habitat of endangered species, predict flood patterns, and evaluate the health of coral reef environments, has never been more acute. To address the increasingly complex web of influences on our ecosystems, today's environmental stakeholders are demanding current information, new analysis techniques and support for new sensors. These systems often need to integrate datasets from a variety of sources and apply best-practice analytical approaches, including for example: data fusion, spectral and spatial analysis, classification, thematic mapping, and integration with Geographic Information Systems (GIS).

There is therefore a need for an improved method of and system for processing large volumes of Earth observation imagery data with efficiency, accuracy, and the ability to integrate several different data systems together.

SUMMARY OF THE INVENTION

It is an object of the invention to provide an improved method of and system for processing large volumes of Earth observation imagery data which obviates or mitigates at least one of the disadvantages described above.

An architectural solution is described, for processing large volumes of Earth observation data (especially imagery) involving a number of data and computationally intensive processing steps. Processing requests can be made via a number of mechanisms including Open GIS Consortium (OGC) Web Processing Service requests or scheduled jobs and the results distributed via a number of mechanisms such as storage in a database accessible to other applications, forwarding as e-mail attachments or OGC compliant Web Coverage Servers. OGC establishes standards for the formatting of inputs, outputs and storage of data, allowing interoperability of various systems, but of course, any standard or proprietary formatting could be used.

The architecture mixes grid (distributed) computing and multiprocessing to achieve a dynamic, flexible system for high throughput using any number of compute servers. The system allows both Windows and Linux based compute servers to be mixed together and can be implemented easily within a typical networked environment without modification; that is, many grid or distributed systems have modified operating systems and/or hardware and are dedicated to a small number of specific tasks, while the system described herein can operate on a generic computer or server with a simple client. Servers can differ in capability (speed or number of CPUs) and advantage can be taken of specialized processing hardware (e.g., Cell processors or Graphic Processing Units) that may be available on some servers to further improve throughput. A job control system is used to allow multiple jobs to be run simultaneously with the system automatically performing load balancing using distributed processing (between servers) and multiprocessing (within servers). This is enabled in part by the overall architecture of the system—the system provides a list of jobs to be performed, and compute servers take the initiative to request jobs when they have capacity, rather than having a central control system which attempts to distribute jobs in an even way.

To deal with the high volume of data throughput required the architecture makes use of a Virtual Parallel File System distributed over the compute servers or a Database Management System (DBMS) that accepts remote connections or web services connected to archives of Earth Observation data.

Processing jobs scripts are implemented in a suitable computer language such as, but not limited to, Python, JAVA, C# or C++ which chain together processing modules (PCI Pluggable Functions) which perform the actual work. Whether the job is compiled ahead of time (e.g., C++) or interpreted at run time (e.g., Python) is dependent on the language chosen. In the preferred embodiment a variety of different scripting languages are used. In some cases, a particular scripting language might simply be more convenient or appropriate. Often, one of the primary considerations in selecting a suitable language is compatibility with related software that the job communicates with. For example, if a job needs to communicate with a third-party application written in C++, the simplest approach is likely to write the job in C++. It is an advantage of the system architecture that various scripting languages are easily accommodated.

The processing modules have a standardized application interface and the types of parameters are limited. This allows the application programming interface (API) to the processing modules and related programmer documentation to be automatically generated for different computer languages and programming environments. That is, a translator or "interface generator" is written for each language. From the standard API, one simply runs the appropriate interface generator to translate the API and documentation to the particulars and syntax of a desired language. A new computer language is accommodated by implementing a new interface generator allowing the same module to be called from processing jobs written in different languages (e.g., Python, JAVA, C# or C++).

Where desirable, individual processing modules may be written to detect and take advantage of available specialized hardware on the compute servers such as multiple CPUs, a Graphical Processing Units (GPUs) or Cell processors to increase performance.

As processing jobs are run, the inputs and actions for each processing step are archived in the Central Job Database. This record becomes an audit history (meta data) for derived results and is optionally delivered with the final results, typically in XML form adhering to the ISO 19139 standards or via an OGC Catalogue Service. This meta data allows each user to check how each product was derived and to allow identification of results that need to be regenerated should any of the original input data be modified in the future (for example—if a more accurate elevation model becomes available) or one of the processing steps is implemented more accurately.

Two processing examples, image correction/mosaicing and image feature extraction, are described in the context of the architecture.

This summary of the invention does not necessarily describe all features of the invention.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. A preferred exemplary embodiment is discussed below in the detailed description of the following drawings.

DETAILED DESCRIPTION OF EXEMPLARY EMBODIMENTS OF THE PRESENT INVENTION

Figure 1:
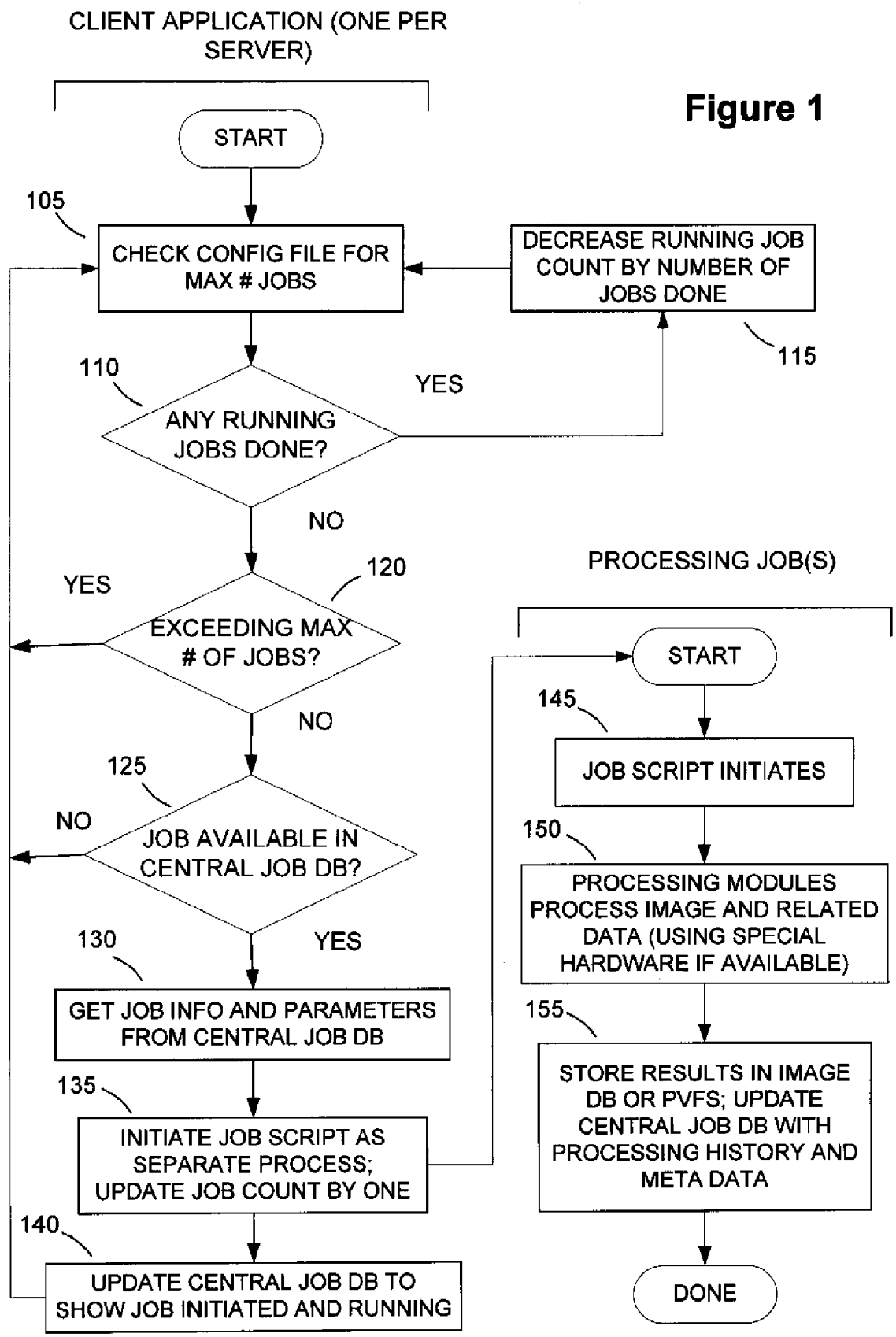
FIG. 1 presents a process flow diagram of an exemplary client application and execution of a processing module according to an embodiment of the present invention.

The present invention will be further illustrated by way of the following examples.

Parallel Architecture Framework

A processing software architecture is used which combines two levels of parallelism: distributed processing of individual images on individual compute servers, while on each individual compute server processing modules making use of available hardware to quickly process the image. The processing on individual compute servers could include parallelism if a multi-core processor is available, use of a Graphics Processing Unit (GPU) or Cell Broadband Engine processor if available. A detailed description of how processing modules make use of available hardware on a particular compute server is provided in the section titled "Processing Modules".

The processing architecture is designed to work in a heterogeneous network (e.g., using both Windows and Linux servers) without modification to the operating systems. As noted above, this is in contrast to many existing systems which are inflexible and dedicated to a limited number of processing tasks. A small job control application is installed on each compute server 215 which monitors the pending job requests and initiates jobs on that compute server 215. The job control application can be configured, for example, to utilize only a portion of the available resources on the compute server 215 or only utilize the compute server 215 at particular times. This allows processing to proceed on existing networks of computers with minimal modification and the processing architecture can co-exist with other applications. A database, for example Oracle or PostgreSQL, may be used as the central communication and co-ordination mechanism for all job control applications running on compute servers 215 in the network. As each independently running job control application initiates a job, accepts the completion of a job, detects failure of a job or collects meta data on a job, this information is updated in the Central Job Database 210. At any point the Central Job Database 210 can be queried to obtain information on the status of a particular job and its audit history.

The architecture allows multiple (and/or different) processing jobs to be run simultaneously. On each compute server 215 a small configuration file tells each job control application how many jobs can be run on that compute server 215. For example, if a particular compute server 215 has four CPUs then three jobs could be run simultaneously, while another compute server 215 having only one CPU may be configured to run two jobs simultaneously. This allows every compute server 215 to potentially have a different number of CPUs with the job control application automatically preventing the compute server 215 from overloading. Because compute servers 215 are prevented from overloading this leads to implicit load balancing between compute servers 215. Within a particular compute server 215 the jobs are automatically load balanced between CPUs using the existing symmetric multiprocessing capability that is part of the Windows or Linux OS. Additionally, the small configuration file provides information on when the compute server 215 is allowed to accept jobs. For example, users' desktop computers may be used as compute servers 215 between 8 pm and 5 am, after regular office hours. The job control application checks periodically to see whether the small configuration file has been modified and if so, re-reads it, to obtain updated configuration information. This allows dynamic reconfiguration of the job control applications and thus dynamic reconfiguration of the overall distributed computing environment. The configuration file for each compute server 215 is provided by the system manager at the time the compute server 215 is added to the system based on the capabilities of the particular compute server 215.

FIG. 1 presents an exemplary flow chart for implementing the client job control application. Typically, only one job control application will be launched per compute server 215. When the job control application is launched it will first check the configuration file 105 to determine how many jobs may be run and any limitations on them. A count of running jobs is kept and as running jobs are completed 110, the count is decremented 115. If the count is at or exceeds the maximum number of jobs, then of course, no additional jobs can be allowed to run and processing loops back to the beginning of the routine. If the count does not exceed the maximum 120, then the job control application/scheduling program will query the Central Job Database 210, where jobs are queued up for execution, to determine whether jobs are available to run 125. If there are no jobs available, then control loops back to the beginning of the routine, otherwise, the routine will obtain information and parameters from the Central Job Database 210 on one or more jobs that the compute server 215 can perform 130.

When a job is to be run (a script for example), it is typically launched as a separate process on the compute server 215, and the running job count will be incremented by one 135. The Central Job Database 210 is then updated on the job being initiated and running 140, and control returns to the beginning of the routine 105.

Each job is launched as a separate process on a given compute server 215, so there could be several jobs running at the same time on a single server. When each job script is initiated 145 it calls processing modules which access image data and related data, taking advantage of any multi-processing capabilities of the operating system 150. Queries are also performed to determine whether a Graphics Processing Unit (GPU), multiple cores, and/or Cell processor is available. As the job is run, processed image data is stored in the image database (or VPFS) 155. Processing history data and/or metadata is also sent to the Central Job Database to update the job status.

The compute server 215 will recognize that this job has been complete when the "running jobs done?" query is made at step 110, so the compute server 215 is free to request additional jobs.

Since transparent access to databases and data files is inherent in the operation of most networks, compute servers 215 can be located on anywhere on a network, either locally (e.g., intranet) or the Internet. For example, processing can be performed simultaneously on a local network of compute servers 215, along with remote compute servers 215 that are rented from one or more third parties.

Data Management and Optimization

A major problem in processing large amounts of imagery is data throughput and management of the location of images to minimize network traffic. The processing architecture preferably uses either a database for data storage and management, or a parallel virtual file system (PVFS) which makes local file systems on each compute server appear to be one global file system.

If a PFVS is used then each compute server 215 can be part of the PVFS. The random distribution of data on the PFVS helps to balance the overall network traffic and disk access. While this approach does not guarantee minimal network traffic it does, on average, provide good performance and removes the complexity of trying to directly optimize data access, thus making it much easier to develop processes for creating new products.

A Central Job Database 210 is used to hold information relating to the running and tracking of jobs status and history and is accessed by all the compute servers 215. The Central Job Database 210 is typically implemented using any relational database that provides record locking to manage concurrent access, for example PostgreSQL or Oracle. A custom or proprietary database could also be used though it would be a great deal of work to develop such a system. The Central Job Database 210 is typically independent of any database used to hold imagery data.

Job Description

Jobs may be written as scripts, in languages such as Python, JAVA, C# or C++, which call a sequence of processing modules (PMs) to take input data (e.g., images), process it, and create new output products. Since there are many different processing modules available many different kinds of jobs can be created.

Figure 2:
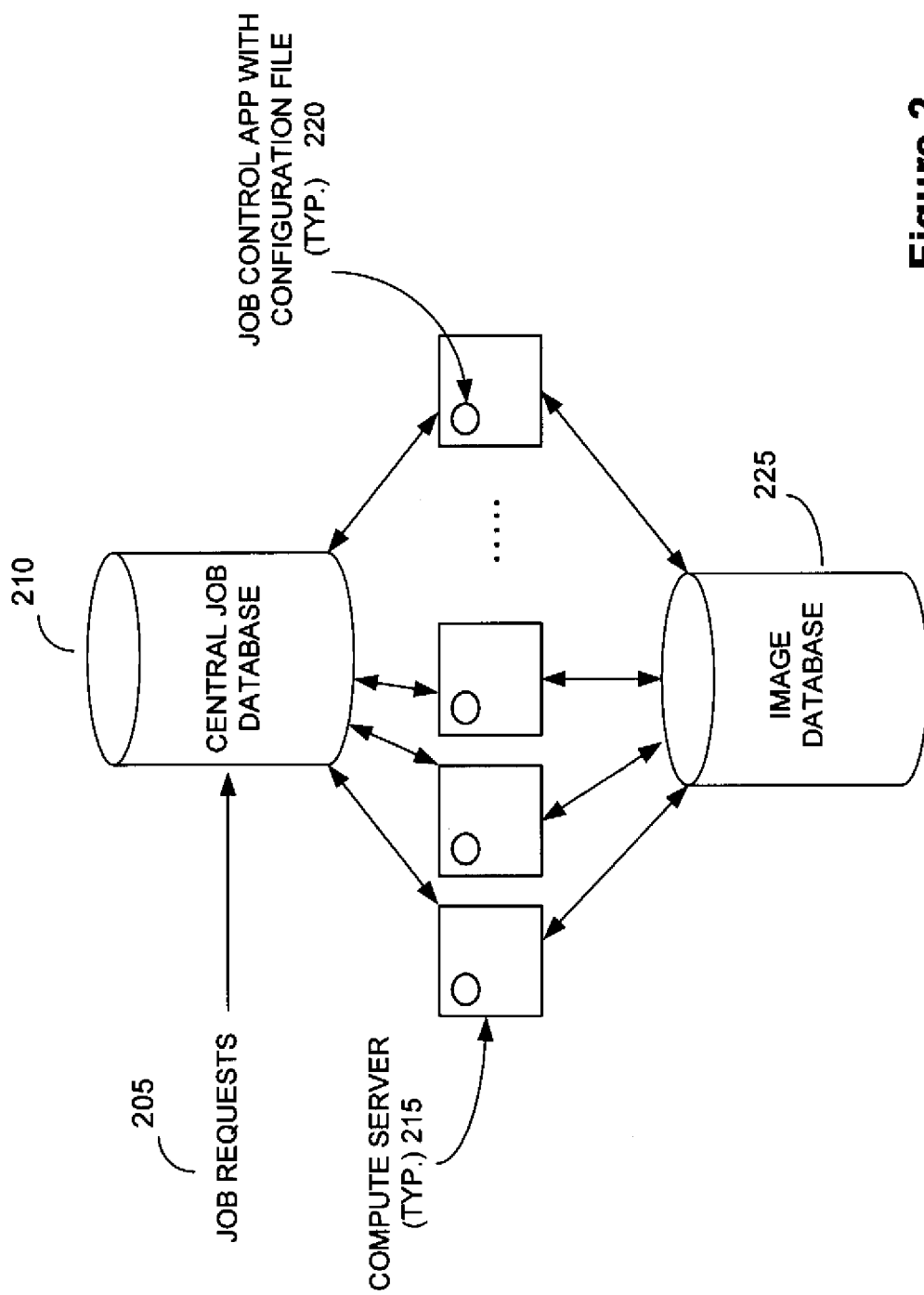
FIG. 2 presents a block diagram of a system overview according to an embodiment of the present invention; Table 1 presents an exemplary listing of possible processing modules.

As shown in the block diagram of FIG. 2, a request to run a particular job 205 is put in a queue in a Central Job Database 210. When a compute server 215 becomes available (and there may be several on the network as show in FIG. 2), its job control application 220 queries the Central Job Database 210 for a new job to run. The job control application 220, with an associated configuration file, schedules jobs for the particular compute server to run. Each compute server 215 may be configured with different numbers of CPU cores and add on acceleration hardware such as a GPU or Cell Processor. Those jobs access image data from the image database 225, a VPFS or by remote access via the web. When the jobs have been processed, the processed data is returned to the same image database 225. The compute servers 215 will also send status, history and metadata information back to the Central Job Database 210.

A script for a job may indicate that parts of the processing can be independently performed using other jobs. For example: a job to ortho-correct one hundred images and then mosaic them together could initiate one hundred small jobs, each of which ortho-corrects a single image. When these are all completed, the original job mosaics them all together. The original job can initiate these 'sub' jobs by directly inserting new job requests into the queue in the Central Job Database 210 and then monitoring the Central Job Database 210 until all the requested jobs are complete. Since there may be many compute servers 215 in a cluster, this mechanism allows the sub-jobs to be spread automatically over the entire cluster as compute servers 215 become available.

Processing Modules

The actual processing of data is accomplished by processing modules typically written in C or C++. A system may consist of many processing modules such as modules to filter images, collect image ground control points, perform image classification or ortho-correct an image. By scripting together different processing modules a wide variety of outputs can be created. A short list of exemplary processing modules is provided in the Table 1—List of Processing Modules. These represent typical modules to process images in the areas of: geometric (and ortho) correction, classification, segmentation, SAR and Polarimetric SAR processing, filtering, elevation processing and watershed analysis. Of course, many other processing modules are known and/or could be used or developed. The invention is not limited by the nature of the processing modules themselves. There are three desirable attributes for processing modules within the context of the system architecture:

1) a consistent application interface which is available in a variety of computer languages (such as Python, JAVA or C++);
2) the ability of a processing module to automatically take advantage of the available hardware of the compute server on which it is run; and
3) availability in both Windows and Linux.

A module that has these attributes means that a script written for a particular processing job (e.g., in Python) could be run on either a Linux or Windows system and processing would automatically take best advantage of underlying hardware. For example, a cluster of compute servers 215 may include both Linux and Windows servers, each with a different number of CPU cores, some even having extra hardware accelerators such as GPUs or Cell processors. When processing images in parallel across this cluster, the same script could be used on all compute servers 215 and automatic use would be made of the available hardware.

Individual processing modules may use different strategies in using the underlying hardware to improve performance. For example: a numerically floating point intensive routine may first check for a GPU and if this is not available then fall back on using parallelism using multiple CPUs if available. Another processing module may check for, and use, a Cell processor if available and fall back to a single CPU otherwise single parallelism may not be inherent in the algorithm. Depending on the algorithm being implemented in a particular processing module, different hardware optimization strategies are employed. It is a straightforward matter to include lines of code in a processing module to perform these checks and take advantage of the efficiencies that the underlying hardware provides.

Processing modules are written such that they can transparently accept a variety of data input sources including: local files, network files, databases, passed memory data structures or data from standardized web services. For example: a job script performing ortho correction may have a processing module that can obtain elevation data from a local file and should that not be available falls back to utilizing a web service providing elevation data for the entire planet (albeit perhaps with lower quality and slower access).

Service Oriented Architecture

The system is preferably implemented using a Service Oriented Architecture (SOA). That is, the requester of a processing job to be run does not need to know anything about the underlying architecture of the system, the distributed processing or computer languages used to implement jobs and processing modules. Requests for processing jobs are also preferably accepted via standard protocols, such as Open GIS Consortium Web Processing Services or SOAP.

Requests for processing can either be by setting parameters to existing job scripts held in the Central Job Database 210 or the requester can directly submit custom scripts (which utilize processing modules available on the system) which will be run by the system. Scripts can be generated in any manner, such as being written using a GUI or wizard, customized, pre-existing, transmitted by email, etc.

Figure 3:
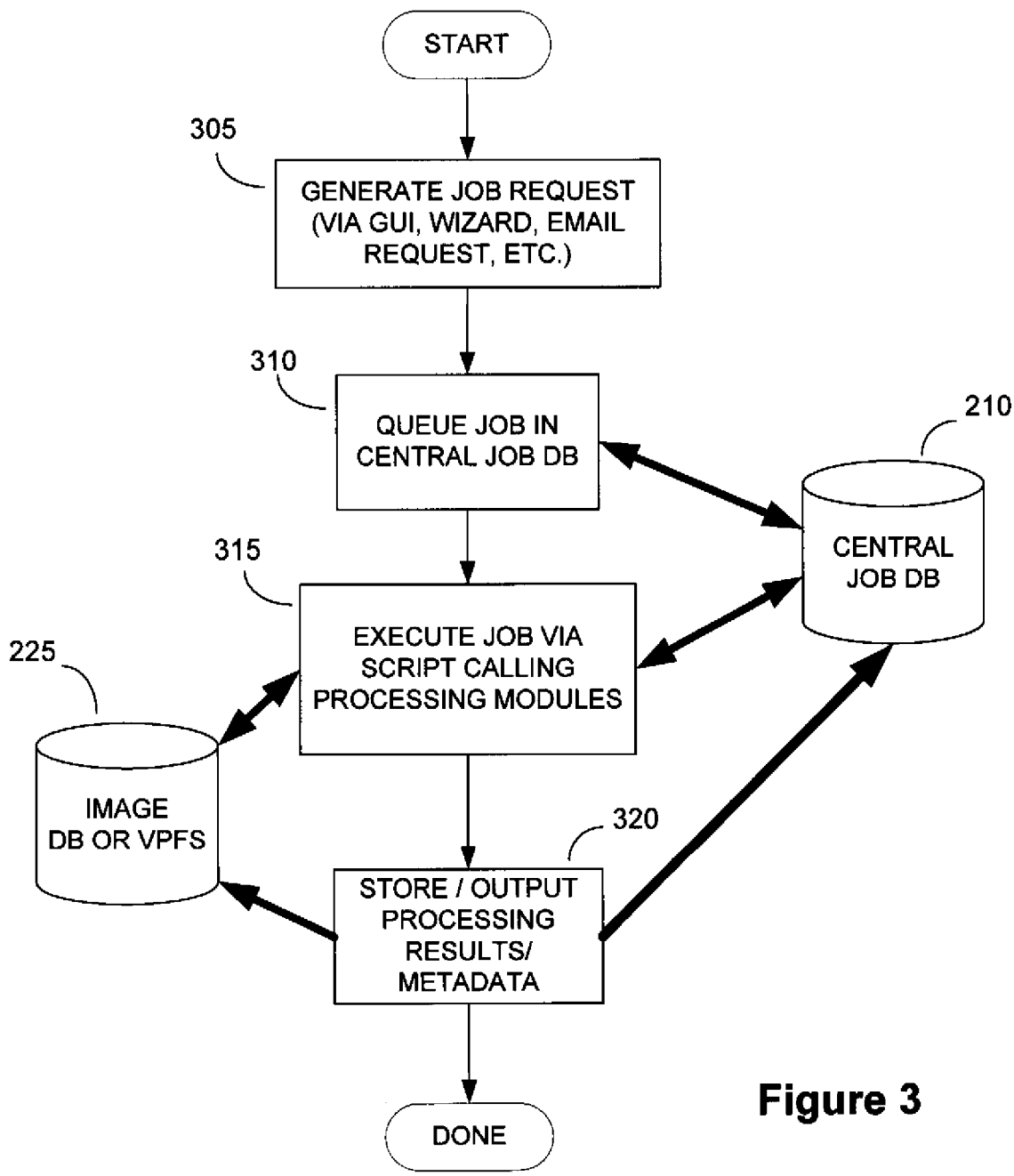
FIG. 3 presents a process flow diagram of the overall method of the processing system according to an embodiment of the present invention.

Thus to summarize, scripts are generated in some manner at step 305 of FIG. 3, and queued 310 in the Central Job Database 210. Processing jobs can then be executed 315 on compute servers 215, via scripts calling processing modules. These processing modules access image and related data from the local image database 225, VPFS or remote access via the Web, and return processed data for storage 320. The compute servers 215 also update the Central Job Database 210 on the work that has been done by transmitting corresponding metadata.

The output data may then be displayed, transferred/stored in other memory devices, and/or undergo additional processing.

Processing Examples Using the Software Architecture

Image Ortho-Correction and Mosaicing

In this example one thousand satellite images need to be ortho-corrected to precise Earth co-ordinates and then mosaiced (stitched) together into a single, large, seamless image covering a very large area. While image ortho-correction is a known technique the overall example is novel in performing the ortho-correction in parallel on a heterogeneous network of compute servers (possibly employing multiple cores or specialized hardware) along with the acquisition of Ground Control Points (GCPs) and Tie Points (TPs) from multiple sources, and the method of computing the colour balancing and cutlines.

Figure 4:
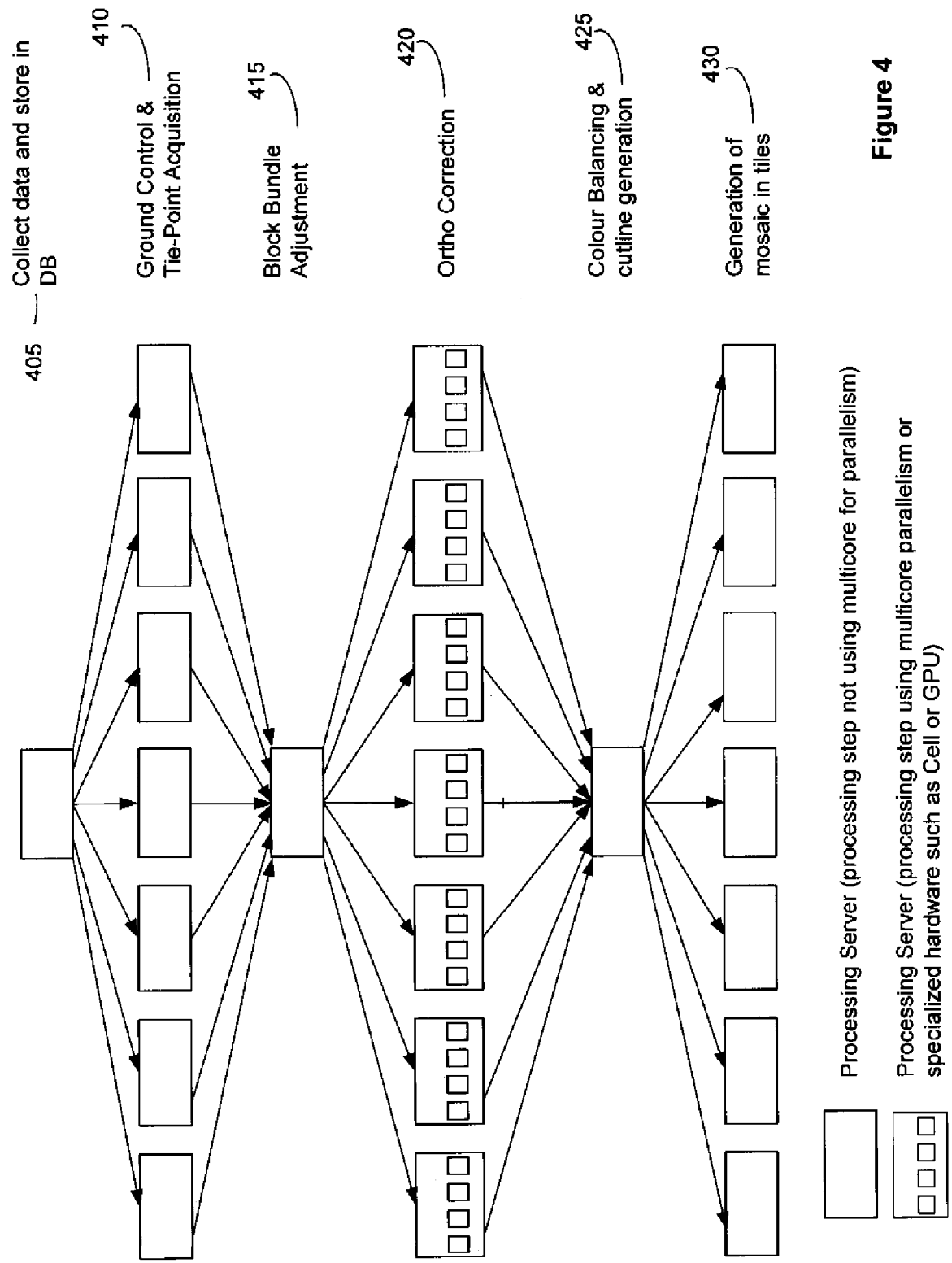
FIG. 4 presents a process flow diagram of a method of ortho-correction and mosaicing according to an embodiment of the present invention.

The block diagram of FIG. 2 presents an exemplary system for affecting this process, while FIG. 4 presents an exemplary flow diagram.

The process begins with the collection of Earth image data from some source 405, such as from a local source or from an Earth Observation data vendor archive, accessed via the web. These images are generally stored in data files whose sizes are kept down to a point that is practical for a typical computer. As a result, it is common to require a large number of separate files to perform an analysis. All of these images are then copied to a database such as Oracle 10g or a PVFS.

The images are distributed over the available compute servers to acquire ground control (GCPs) and tie-points (TPs) between overlapping images 410. Ground control points can be obtained from multiple sources such as existing ortho-corrected imagery, image chip databases or geocoded features represented by vectors (such as roads or lake polygons), using known techniques. Sources can be either local to the network or accessed via standardized web services from data vendors. Tie-points are obtained by matching points on overlapping images again, using known techniques. The GCPs from multiple sources are merged together to optimize them for accuracy and distribution over the image. Acquired GCPs and TPs for each image are stored in a central location such as in the Image Database 225.

All the GCPs and TPs are simultaneously used in a block model calculation to create an optimized correction model for each image, using a known technique. A large single calculation (again, a known calculation) is then performed on all of block models, with the result being an optimized model for each image. The optimized models both correct to ground co-ordinates and minimize errors between overlapping images. Because it is a large, single calculation, it is more efficient to compute them all together, on a single compute server. The GCPs and TPs are used as inputs to the optimized correction model and then are no longer used.

The images are then ortho-corrected using a known algorithm 420, except that the task is distributed over all the available compute servers 215. Ortho-correction is the correction of terrain-induced distortion.

Within each compute server 215 the original image is requested from the image database or PVFS and the ortho-correction is speeded up by utilizing any multiple cores or specialized processors (such as the Cell processor or GPU) that are available on that particular compute server 215. To reduce data overhead, information (such as digital elevation data or DEMs) which are of reasonable size and do not change from processing job to processing job, are stored locally on each compute server 215. The resulting ortho-corrected image is stored in the image database or PVFS.

Figure 5:
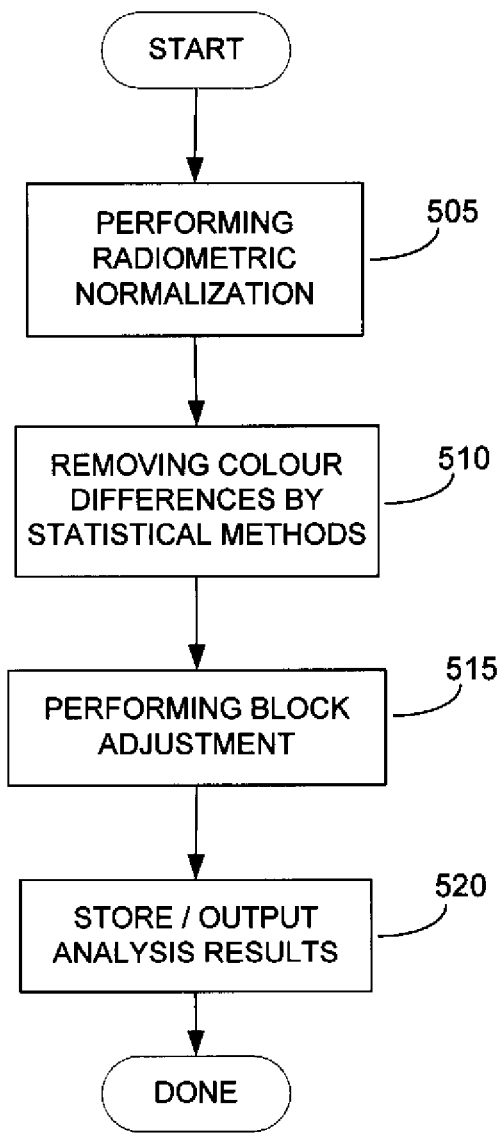
FIG. 5 presents a process flow diagram of a method of perform cutline and colour balancing according to an embodiment of the present invention.

From the ortho-corrected images the cutline and colour balancing is computed 425. This is typically performed on a single compute server 215 as shown in FIG. 4, because all the information from all the images needs to be considered simultaneously. Colour balancing may use a number of steps, for example, as shown in the flow chart of FIG. 5:

1) radiometric normalization 505 which attempts to remove most of the differences between images using known physical properties, such as sensor calibration and top of atmospheric radiance corrections based on sun intensity;

2) remaining colour differences are removed by gathering statistical differences 510 between images in overlapping areas, eliminating anomalies (such as clouds and shadows) via statistical methods (such as Thiel-Sen robust regression); and then 3) performing a block adjustment using these statistics to minimize colour differences 515.

The resulting colour balanced data is then returned to the image database or PVFS 520.

Cutlines (i.e., the actual seam lines between images) are computed to minimize apparent differences by following natural features in the image (such as rivers or roads). Techniques are known for performing these computations. The colour balancing results and cut lines are stored in the image database or PVFS so operations in following steps can use them.

And finally, the generation of mosaic tiles, based on cutlines, colour balancing and ortho-corrected images, is distributed across all compute servers 430. Techniques are known for performing these computations. Resulting tiles are stored in the image database, PVFS or directly in the final delivery location or media.

Image Feature Extraction

Figure 6:
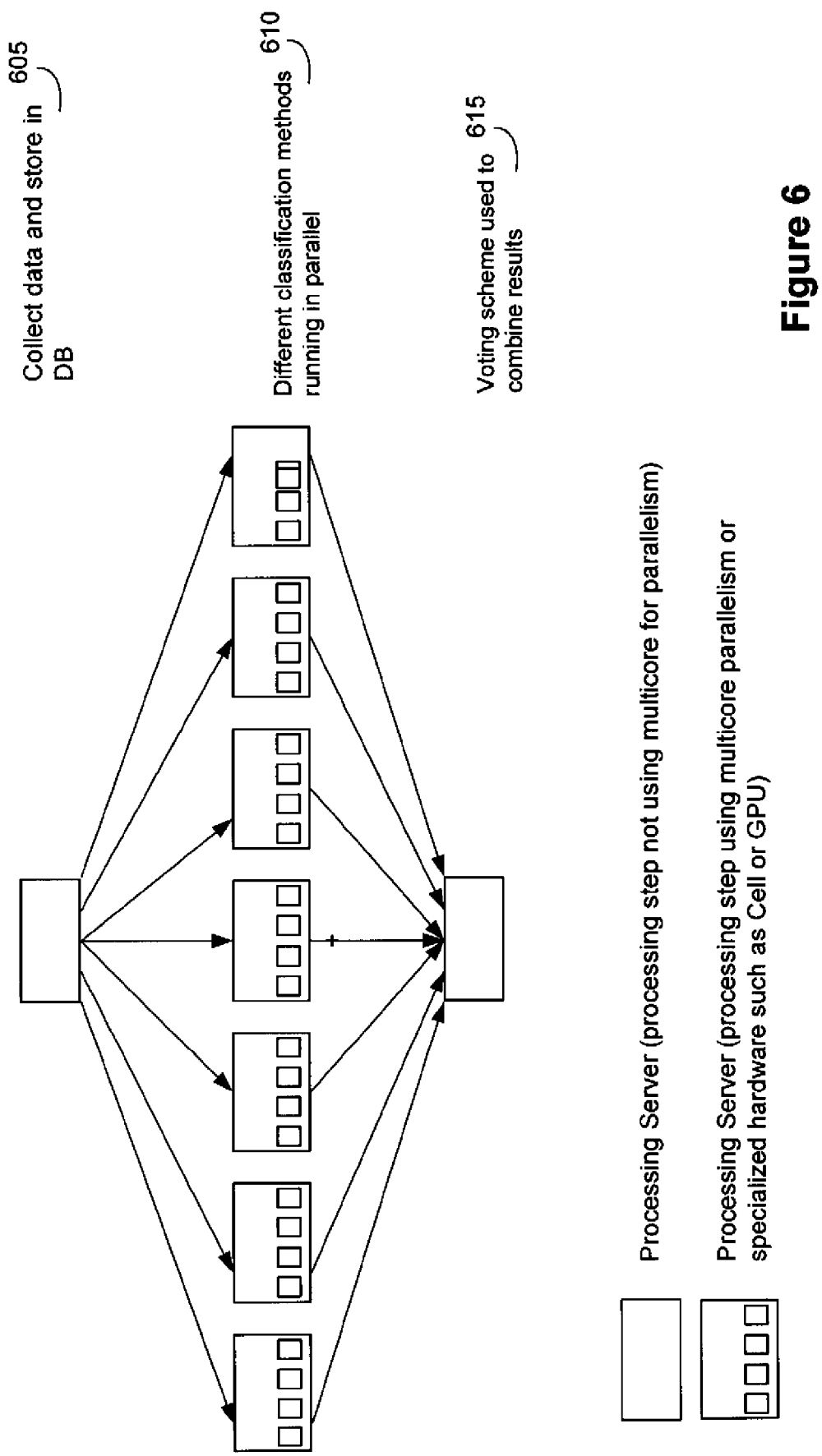
FIG. 6 presents a process flow diagram of a method of image classification according to an embodiment of the present invention.

In this example a single image is classified (interpreted) by using a number of different methods in parallel and the results are merged into a single final result as shown in FIG. 6. The processing architecture described in this document allows many different classifiers to be simultaneously run in a reasonable length of time, allowing novel computing intensive approaches to be taken.

As with the process of FIG. 4, described hereinabove, the process begins with the collection of Earth image data from some source 605, such as from a local source or from an Earth Observation data vendor archive, accessed via the web. These images are collected and stored in a number of data files in the image database 225.

A different classification method is then initiated 610 on each compute server 215. Candidate classification methods could include: Maximum likelihood classification, Neural Networks, Minimum distance, KNN, or K-Means or others depending on specific circumstances or the knowledge of the implementor. While each classification method runs on a different compute server 215 each compute server 215 may have multiple cores which can run portions of the classification in parallel. Each classification method may utilize different sets of ancillary data obtained as part of its classification process, either obtained locally or via the web. The results of each classification are stored in the image database 225 or PVFS.

Figure 7:
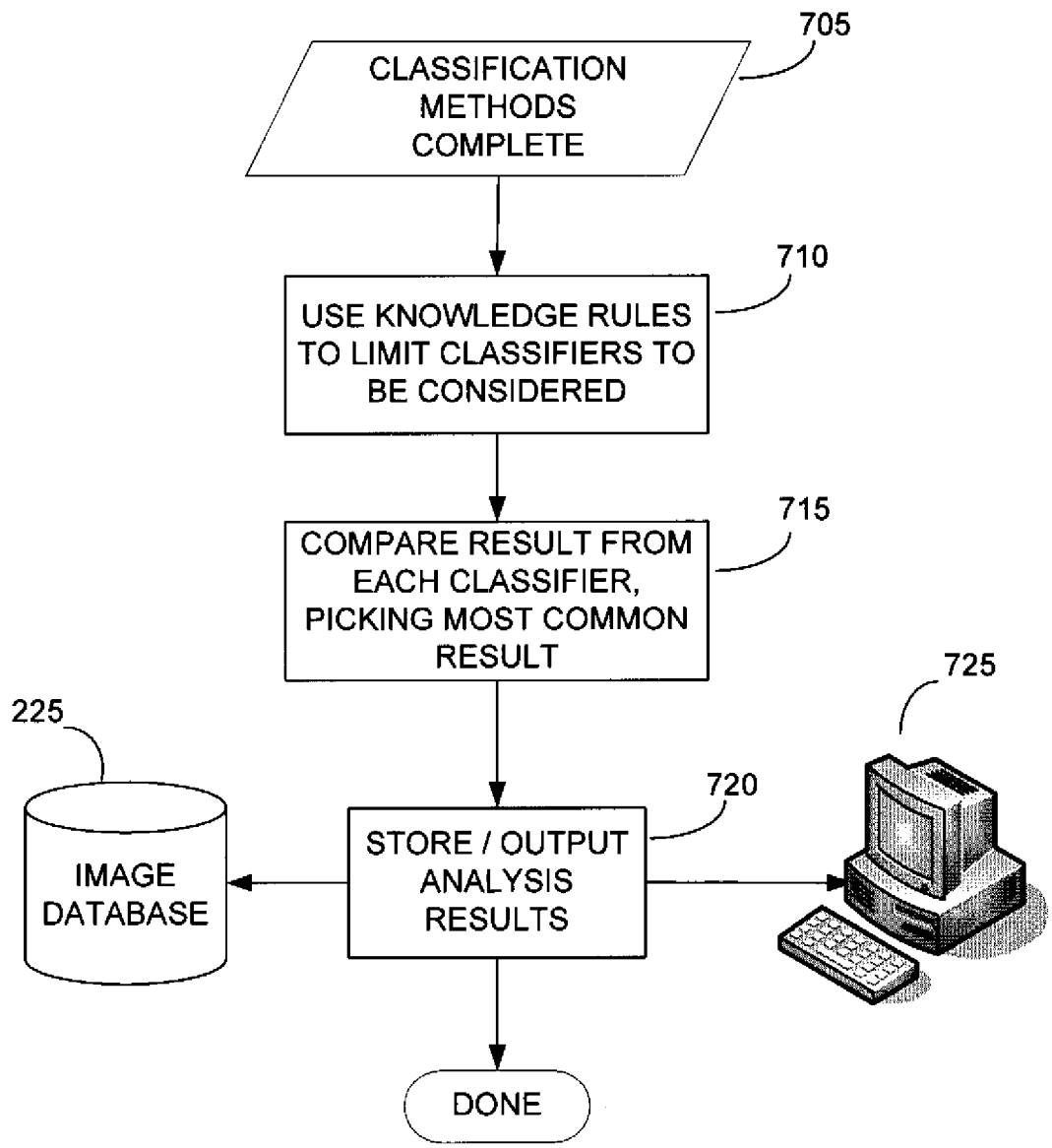
FIG. 7 presents a process flow diagram of a method of image feature extraction voting according to an embodiment of the present invention.
Figure 2:
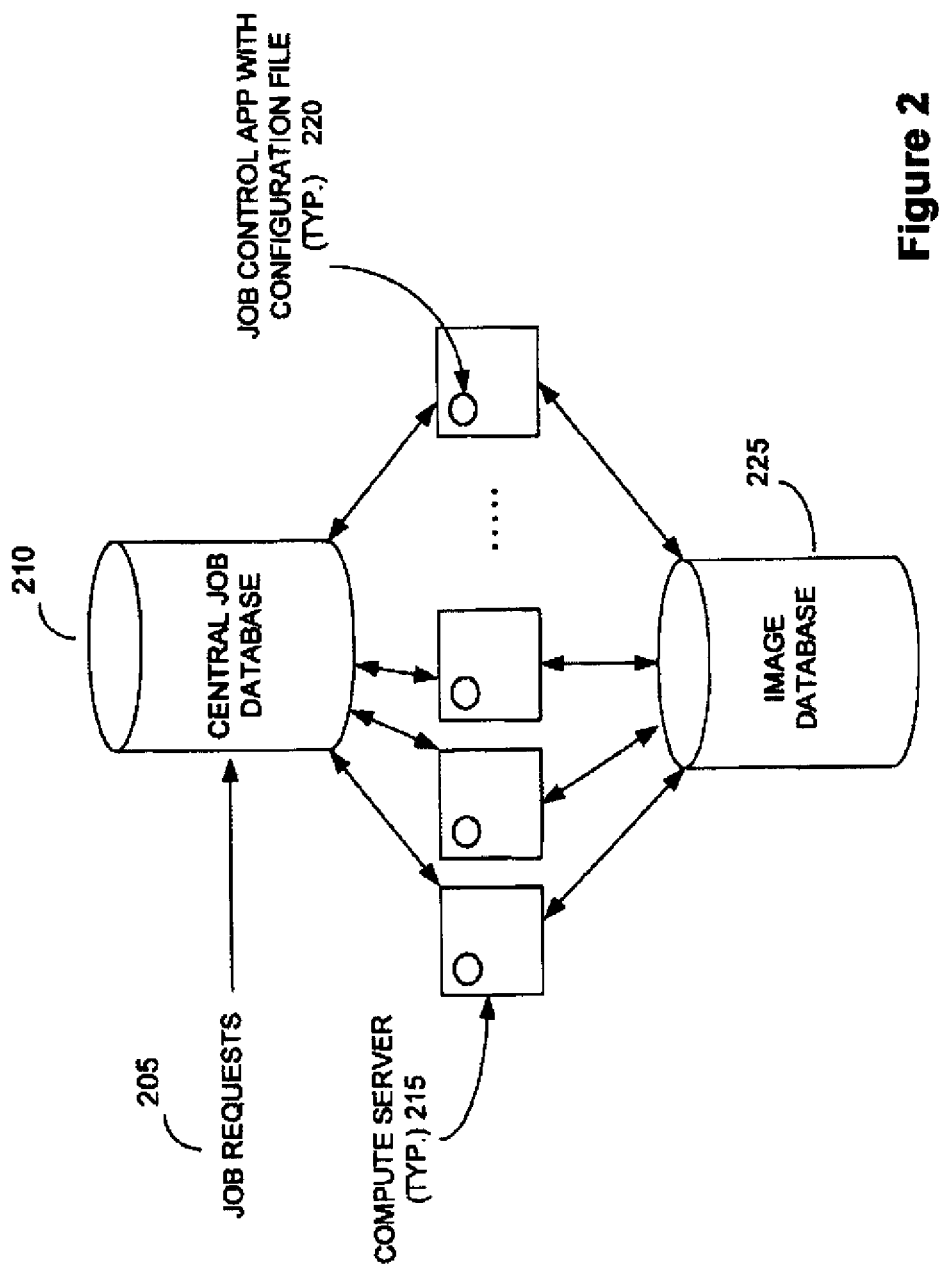
Figure 3:
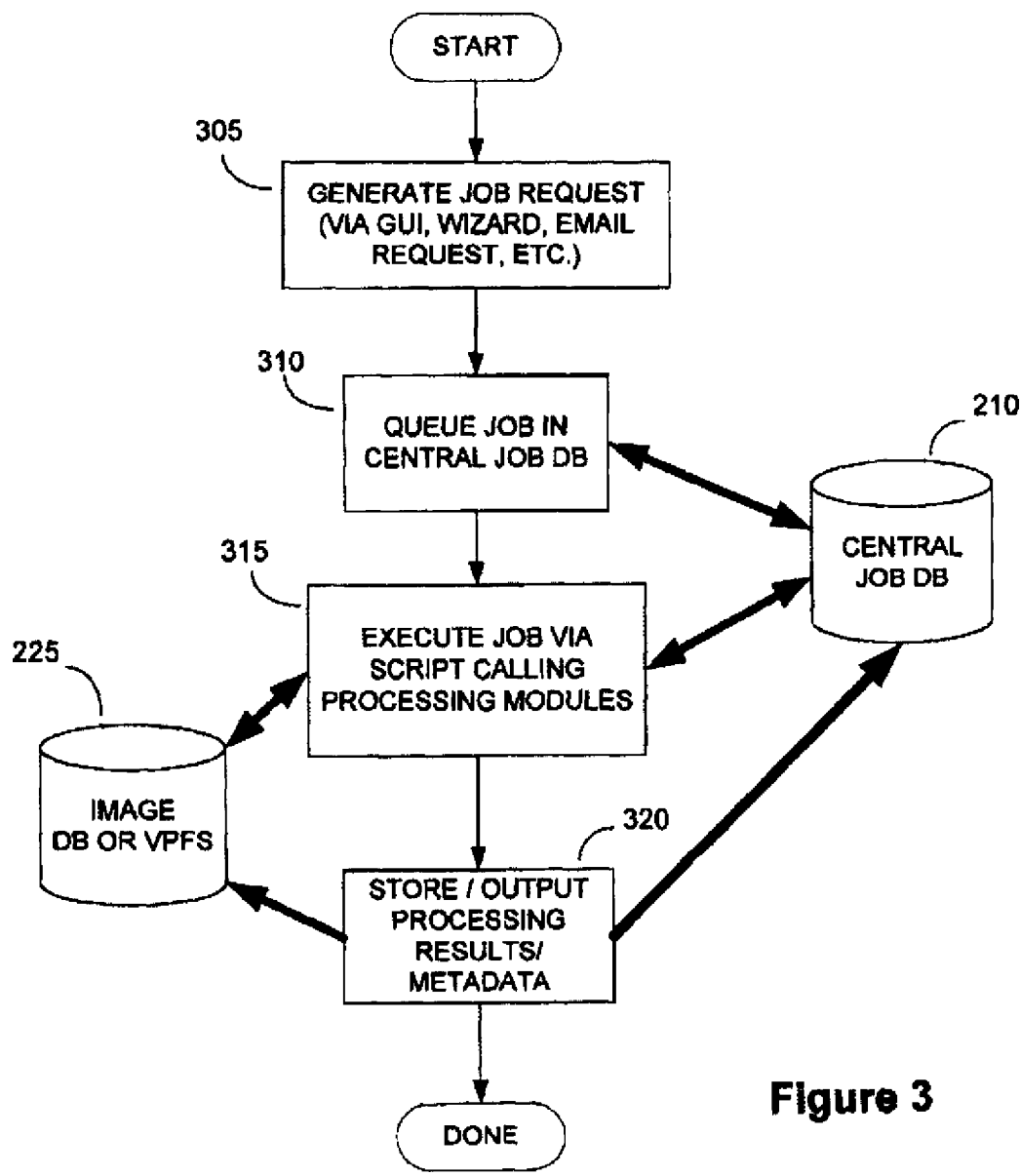
Figure 4:
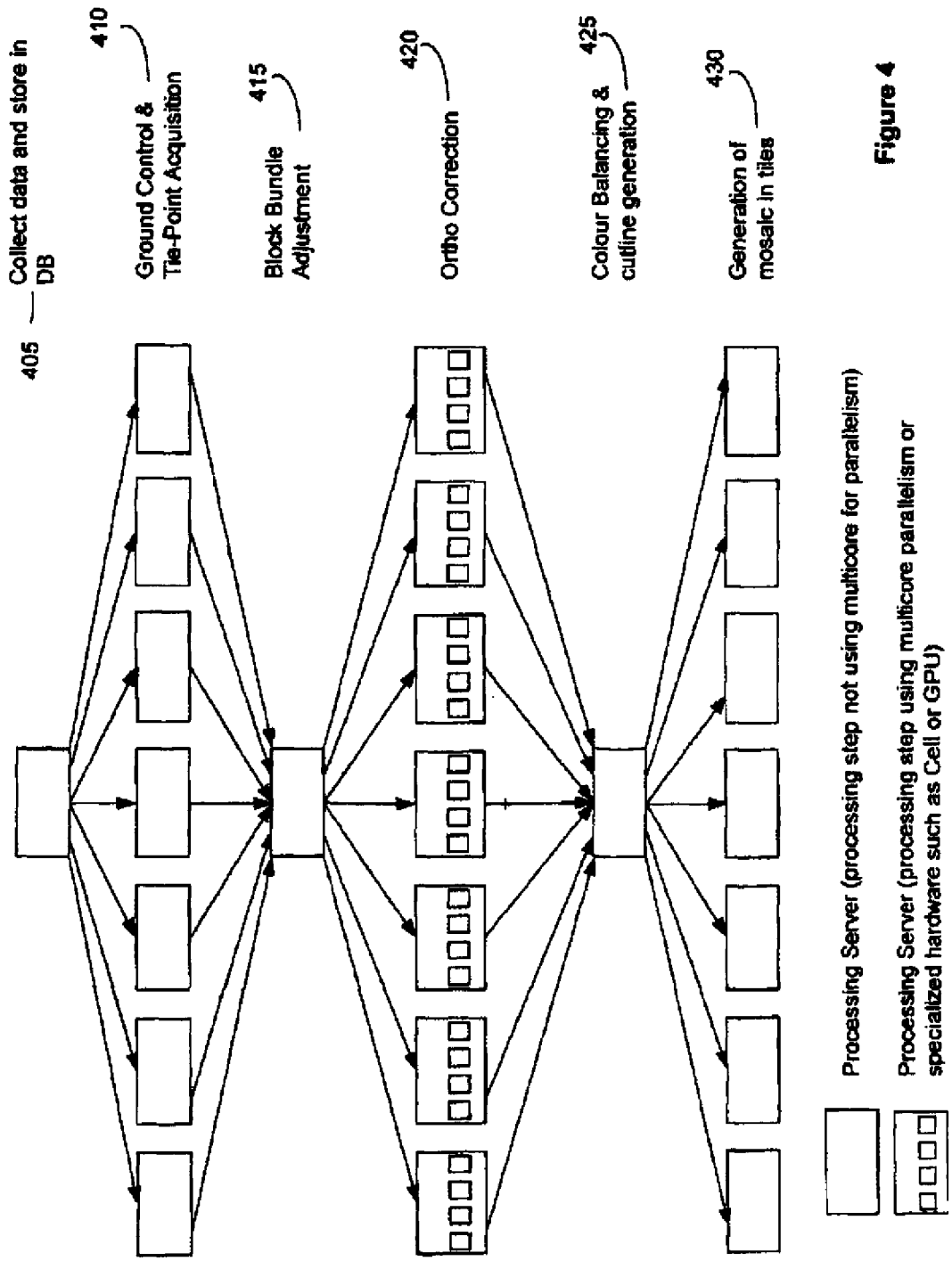
Figure 5:
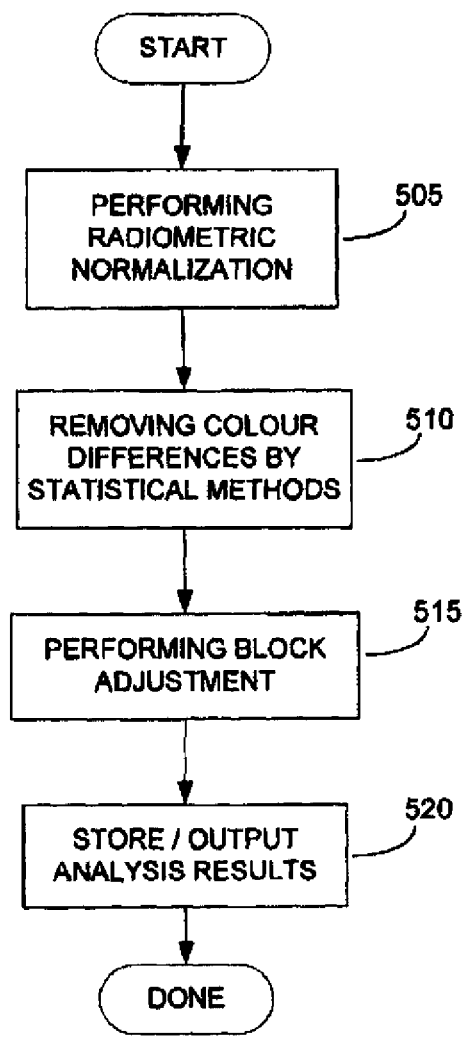
Figure 6:
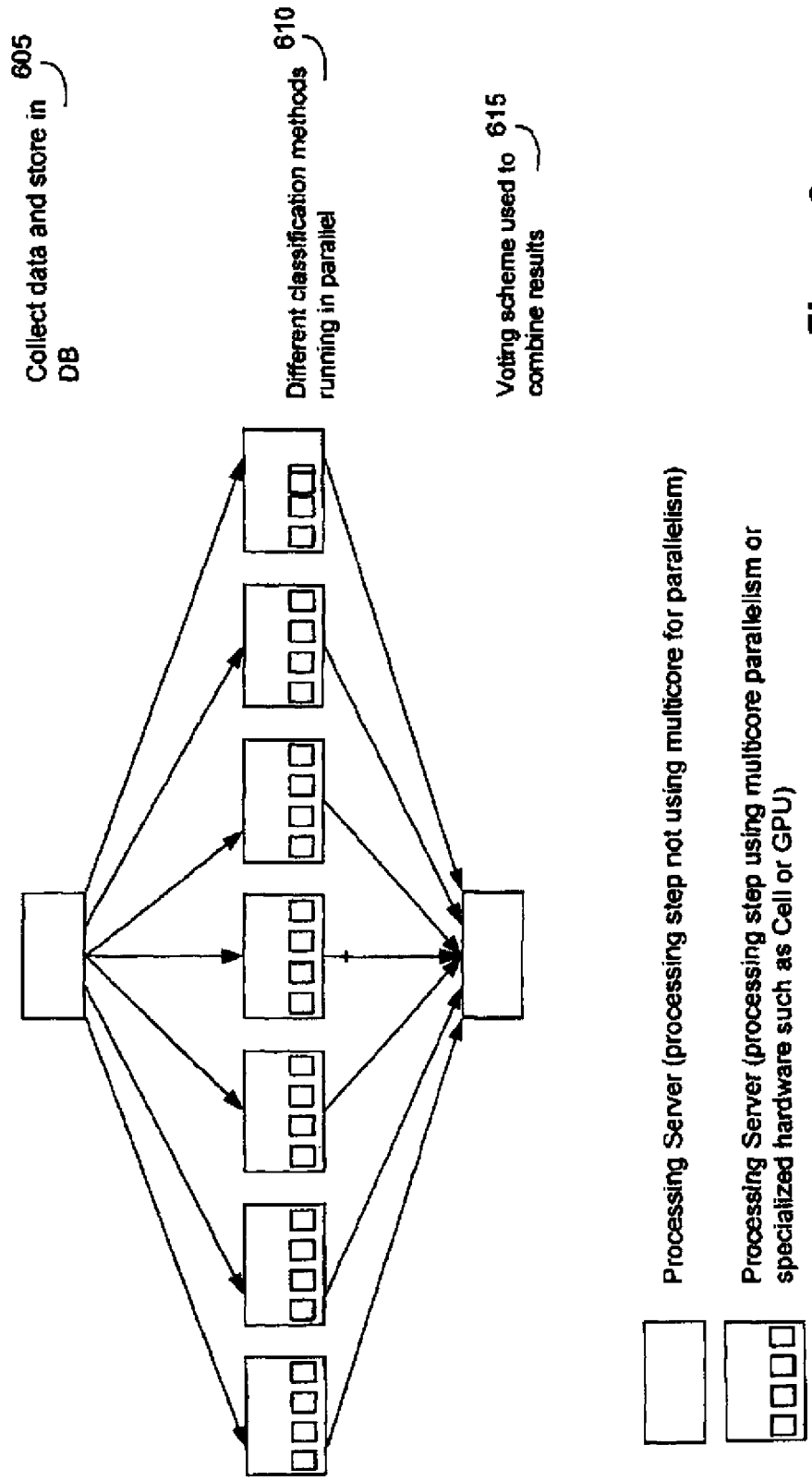
Figure 7:
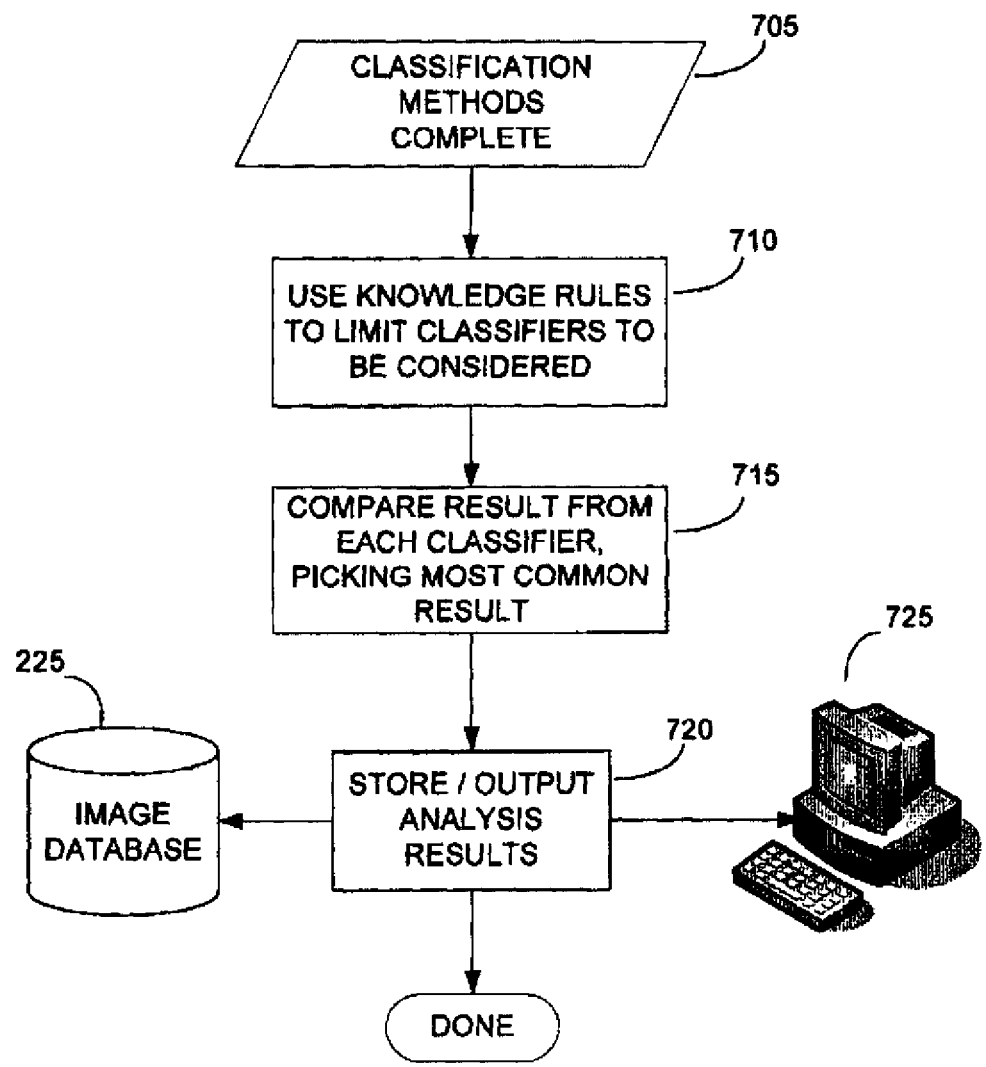

Once all the classification methods are complete a single interpretation is created using a 'voting' system and knowledge rules to create a final result 615. The flow chart of FIG. 7 presents an exemplary method of performing this 'voting' process. When the various classification methods have been completed 705, the system uses knowledge rules to limit the classifiers to those which are most relevant to the current analysis, or gives greater weight to more significant classifiers 710. This step may be performed before or after the voting step depending on the nature of the knowledge rules. Of course, several knowledge rules may be applied, some before, and some after the voting step. For example, if there is previous knowledge that a particular classifier has extremely high accuracy for a particular class (e.g., water) then when that result is obtained for a particular pixel it may over-rule the result from the voting system (i.e. the knowledge rule being applied after the voting step). As another example, other knowledge rules can be applied such as agricultural crops may only exist in known farm boundaries in which case the voting may be restricted to methods known to be good for agricultural crops (i.e. the knowledge rule being applied before the voting step).

The voting system then compares the result from each classifier, for each image pixel, and picks the result which was most common 715. By using several different interpretation methods (none of which is best in all circumstances) it is possible to create a result which is better than any single method based on a weighted consensus between many methods.

The optimal result is then stored 720 in the image database 225 and possibly displayed or output in some manner 725, for example on a personal computer having a visual display and user interface.

Conclusions

The present invention has been described with regard to one or more embodiments. However, it will be apparent to persons skilled in the art that a number of variations and modifications can be made without departing from the scope of the invention as defined in the claims. For example:

1) the grid of compute servers could be made up systems running operating systems such as UNIX (using SUN, SGI or IBM processors) instead of Windows or Linux on an Intel based processor;

2) high speed storage could be implemented via other methods such as solid state devices (e.g., based on RAM or Flash RAM) or Storage Area Network devices instead of a Virtual Parallel File System or a Database;

3) while black and white or colour imagery data is most commonly used the scope of the invention includes any raster data sets including: multispectral imagery, hyperspectral imagery, Synthetic Aperture Radar imagery, Polarimetric Radar imager, and spatial Raster GIS information; and 4) Earth observation imagery sources can include those collected from space or airborne sensors.

The method steps of the invention may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

All citations are hereby incorporated by reference.

TABLE 1

| NAME | DESCRIPTION |
|---|---|
| adem | Airphoto Automatic DEM Extraction |
| aepipro | Airphoto Epipolor Projection |
| ARI | Image Channel Arithmetic |
| ATCOR3 | Atmospheric Correction using Elevation Data |
| ATCOR3_T | Surface Temperature using Elevation Data |
| autochip | Automatic Chip Matching for GCP collection |
| avg | Unsupervised Texture Segmentation |
| cdeosat | CD EOSAT Fast Format |
| cdirss | CD IRS Super Structure Format |
| Cdland7 | CD LANDSAT 7 Format |
| cdlandb | CD TM Brazilian Format |
| cdsar | CD ERS/PALSAR/RADARSAT LGSOWG Format |
| cdsat | CD ERS/RADARSAT CCT Format |
| cdspot | CD SPOTIMAGE SPOT Format |
| chipext | Chip Extraction |
| chipmat | Chip Match |
| CIM | Create Image Database File |
| CLS | Cluster Definition Classification |
| context | Contextual Classification |
| CONTOUR | Contour Generation from DEM |
| CSG | Classifier Signature Generator |
| DECORR | Decorrelation Stretch |
| DIM | Delete Image Database File |
| DRAIN | Drainage Basin from Elevation Data |
| endmemb | Find a Set of Endmember Spectra |
| EXPORT2KML | Export to Google Earth KML or KMZ |
| FAV | Averaging (Mean) Filter |
| FED | Edge Detection Filter (up to 33 × 33) |

TABLE 1-continued

| NAME | DESCRIPTION |
|---|---|
| fefrost | Enhanced Frost Filtering |
| felee | Enhanced Lee Adaptive Filtering |
| FERODEH | Erode Holes Filter (up to 1001 × 1001) |
| FEXPORT | Export To Foreign File |
| FFREQ | Frequency Domain Image Filter |
| ffrost | Frost Adaptive Filtering |
| fftmpoly | Extract GCPs by image-polygon matching. |
| fftmvec | Extract GCPs by image-vector matching. |
| FGA | Gaussian Filter (up to 33 × 33) |
| fgamma | Gamma Map Filtering |
| FIMPORT | Import Foreign File |
| fkuan | Kuan Filtering |
| fle | Lee Adaptive Filtering |
| FME | Median Filter (up to 7 × 7) |
| FMO | Mode Filter (up to 7 × 7) |
| FPAR | Fraction of Absorbed Photosynthetically Radiation |
| FPR | Programmable Filter (up to 33 × 33) |
| FPRE | Prewitt Edge Filter (up to 33 × 33) |
| FRD2P | Reduction to Pole Filter |
| FSHARP | Sharpening Filter (up to 33 × 33) |
| FSOBEL | Sobel Edge Filter (up to 33 × 33) |
| Fspec | SAR Speckle Filtering |
| FTF | Frequency Transforms Forward |
| FTI | Frequency Transforms Inverse |
| Fusion | Data Fusion of Two Input Images |
| fuz | Unsupervised Fuzzy Clustering |
| FUZCLUS | Fuzzy K-Means Clustering |
| GCII | Image to Image GCP Collection |
| GCIM | Image to Map GCP Collection |
| GCIT | Image to Terminal GCP Collection |
| GCIV | Image to Vector GCP Collection |
| gcpelevGCP | Elevations from a DEM |
| gcppro GCP | Transformed by Projection |
| gcprefn GCP | Refinement |
| genclut | Generate a Spectral Line Curvature Correction LUT |
| genrlut | Generate an At-Sensor Radiance LUT |
| GRDINT | Vector Grid Interpolation |
| GRDPNT | Point Coverage Gridding |
| GRDPOL | Polygon Coverage Gridding |
| HIS | Histogramming Database Image |
| histex | Histogram-based Texture Measures |
| HMM | Histogram Migrating-Means Clustering |
| HOM | Homogeneous Area Classification |
| HSG | Histogram Signature Generation |
| i2sp | Output Band Vectors as Image Spectra. |
| idint | Inverse Distance Interpolation |
| IHS | RGB to IHS Conversion |
| IIIBIT | Database Image Transfer Under Bitmap |
| Imerge | Merge Image Files |
| IND | Index Analysis |
| IPG | Image Polygon Growing |
| ISOCLUS | Isodata Clustering |
| KCLUS | K-Means Clustering |
| KNN | K-Nearest Neigbour Classification |
| KRIGING | Point Interpolation Using Kriging |
| LAI | Leaf Area Index Model |
| LRP | Image Line Replacement |
| LUT | Image Enhancement via Lookup Table |
| mal | Mallat Wavelet Transformation |
| MASKING | Calculate Haze and Cloud Mask |
| MAT | Matrix Analysis |
| MATCH | Histogram Matching LUT |
| METASET | Set a Metadata Value |
| MINDIS | Minimum Distance Classifier |
| MLC | Maximum Likelihood Classifier |
| Mnfnr | Max. Noise Fraction Based Noise Removal |
| MODEL | Modelling Program |
| MOSAIC | Image Mosaicking |
| MTE | Martin-Taylor Transformation |
| NDVI | Compute NDVI from AVHRR Data |
| NGCLUS2 | N-bit Narendra-Goldberg Clustering |
| nnclass | Neural Network Classification |
| nnint | Natural Neigbour Interpolation |
| Nntrain | Neural Network Training |
| ORARASLOAD | Export Raster To ORACLE DATABASE |
| ORAVECLOAD | Export vectors To ORACLE DATABASE |
| ortho | Orthorectification |
| OVL | Overlay Analysis |
| PCA | Principal Component Analysis |
| Pansharp | Pan sharpen an Image |
| PRX | Proximity Analysis |
| Psboxcar | POLSAR Boxcar Filter |
| Pscc | Corr. Coeff. for Two POLSAR Elements |
| psclopot | Cloude-Pottier Classification |
| pseaba | Entropy, A-angle, B-angle, and Anisotropy |
| psfredur | Freeman-Durden Unsup. Classification |
| PSG | Perspective Scene Generation |
| Psinang | Incident Angle Map |
| Psinten | POLSAR Element Intensity |
| psintrat | Intensity Ratio of Two POLSAR Elements |
| pspedht | Polarization Response Pedestal Height |
| Psphdiff | Phase Difference of POLSAR Elements |
| Pspoldis | Polarimetric Discriminators |
| pspolfil | POLSAR Speckle Filter |
| pspolsyn | General POLSAR Backscatter Synthesis |
| Pspolsync | Contrast Maximized Backscat. Synthesis |
| pspolsynr | Target Maximized Backscatter Synthesis |
| pssscm | Symmetric Scattering Charact. Method |
| psswis | Supervised Wishart Classification |
| Pstotpow | Total Power |
| psuswis | Unsupervised Wishart Classification |
| psvanzyl | Unsupervised van Zyl Classification |
| pswhite | Whitening Filter Target Detection |
| Pyramid | Build Image Overview Pyramids |
| rbfint | Radial Basis Function Interpolation |
| regpro | Image Registration and Projection |
| REL | Shaded Relief from Elevation Data |
| rsdem | Radarsat Automatic DEM Extract |
| rstr | SAR Image Contrast Stretch |
| Rtcsigm | SAR Backscatter with Terrain Correction |
| RTV | Raster to Vector Conversion |
| sam | Spectral Angle Mapper |
| Sarbeta | Generate Radar Brightness |
| Sarclass | Classify Segmented SAR Image |
| sarincd | SAR Incidence Angle Estimation |
| sarseg | Segment Single Channel SAR image |
| sarsigm | Generate Radar Backscatter |
| sartex | SAR-specific Texture Measures |
| SAVI | Soil Adjust Vegetation Index |
| sdem | Satellite Automatic DEM Extract |
| SEED | Automatic Watershed Seed Starter |
| Sepipro | Satellite Epipolor Projection |
| shftcw | Shift Centre Wavelength Values |
| SHRINK | Shrink Areas in Theme Channel |
| sieve | Sieve Filter (Class Merging) |
| SIGJPL | Display Polarization Signature |
| SIGMERG | Classifier Signature Merging |
| SIGSEP | Classifier Signature Separability |
| slc2img | Convert SLC to Image |
| slccor | Apply a Spectral Line Curvature Correction LUT |
| SLP | Slope of Elevation Data |
| smodel | Satellite Model Calculation |
| smspec | Smooth Spectra |
| smodel | Satellite Model Calculation |
| smspec | Smooth Spectra |
| solarzaz | Solar-zenith and Solar-azimuth Calculator |
| sortho | Satellite Image Orthorecification |
| sp2rt | Convert a Spectrum to a Rad. Trans. |
| spadd | Spectrum Record Addition |
| spbanal | Spectral Band Analysis |
| spconv | High to Low Resolution Spectral Convolution |
| spconvf | High-to-Low Filter Convolution of Spectrum |
| spconvg | High-to-Low Gaussian Convolution of Spectrum |
| spconvp | Convolve Spectra With Response Profiles |
| spfit | Fit Spectrum to Reference Spectrum |
| Spfunc | Spectral Algabraic and Trig Functions |
| sphull | Create Segmented Upper Hull Continuum |
| spimari | Spectrum Image Arithmetic Operations |
| spmod | Spectrum Library Record Modification |
| spnorm | Spectrum Normalization |
| Spunmix | Spectral Linear Unmixing |
| srortho | Satellite Radar Image Ortho. |
| srtogr | Slant Range to Ground Range Conversion |
| SST | Sea Surface Temperature from AVHRR Data |
| strpcor | Stripe Correction |
| SYNTH | Synthesize Arbitrary Polarization Image |

TABLE 1-continued

| NAME | DESCRIPTION |
| --- | --- |
| tex | Texture Analysis |
| THR | Thresholding Image to Bitmap |
| VDEMINT | Grid DEM from Vector Layers |
| VECREG | Vector Registration (Warping) |
| video | Digital/Video Camera Parameters |
| WTRSHED | Watersheds from Elevation Data |

What is claimed is:

1. A system for processing a large volume of Earth observation imaging data comprising:
    a computer including a visual display and a user interface;
    a plurality of compute servers;
    an image database storing said Earth observation imaging data as a plurality of separate image data files;
    a network for interconnecting said computer, said plurality of compute servers and said image database;
    said plurality of compute servers being operable to process said separate image data files in a distributed manner using different classification methods;
    at least one of said plurality of compute servers being operable to process said separate image data files in a multiprocessing environment;
    at least one of said plurality of compute servers being operable to collate processed separate image data files into a single imaging result; and is operable to execute a voting scheme to select the output of one of said different classification methods as an optimal result;
    further comprising a central job database for storing a list of jobs to be performed, said jobs defining said processing to be performed, and said plurality of compute servers being operable to request jobs from said list;
    wherein each of said separate image data files includes Ground Control Points, and said processing is performed using said Ground Control Points to correct to ground co-ordinates; and
    wherein each of said separate image data files includes Tie-Points, and said processing is performed using said Tie-Points, to minimize errors between overlapping images.

2. The system of claim 1, wherein said central job database is further operable to store job status, history data and metadata, said plurality of compute servers being operable to send job status, history data and metadata to said central job database.

3. The system of claim 2, wherein said central job database comprises a relational database.

4. The system of claim 1, wherein said plurality of compute servers are operable to request jobs from said list when they have capacity.

5. The system of claim 4, wherein said plurality of compute servers are operable to request jobs from said list during specified times.

6. The system of claim 4, wherein each of said plurality of compute servers includes a configuration file specifying the number of jobs which may be run.

7. The system of claim 1, wherein said jobs comprise scripts.

8. The system of claim 7, wherein said scripts call stored processing modules having a standard application programming interface (API).

9. The system of claim 8, further comprising an interface generator operable to translate the API and documentation to the particulars and syntax of a desired scripting language, allowing processing modules to be called from scripts written in different languages.

10. The system of claim 8, wherein said processing modules are operable to receive input data from local files, databases, memory objects or Web services.

11. The system of claim 1, wherein said network includes a local area network (LAN) and at least one of said plurality of compute servers is accessible via said LAN.

12. The system of claim 1, wherein said network includes an Internet network and at least one of said plurality of compute servers is accessible via the Internet.

13. The system of claim 1, wherein at least one of said plurality of compute servers is operable to process said separate image data files using specialized internal hardware.

14. The system of claim 13, wherein said specialized internal hardware is selected from the group consisting of multiple CPUs, one or more Graphical Processing Units and a Cell processor.

15. The system of claim 13, wherein at least one of said plurality of compute servers is operable to process said separate image data files using symmetric multi-processing (SMP).

16. The system of claim 1, wherein said image database comprises a parallel virtual file system (PVFS).

17. A method for processing a large volume of Earth observation imaging data comprising the steps of:
    storing said Earth observation imaging data as a plurality of separate image data files on an image database;
    storing a list of jobs to be performed, on a central job database, said jobs defining processing to be performed;
    processing said separate image data files in a distributed manner on a plurality of compute servers, using different classification methods, said plurality of compute servers and said image database interconnected by a network;
    said processing including processing using Ground Control Points to correct to ground co-ordinates, and processing using Tie-Points, to minimize errors between overlapping images;
    at least one of said plurality of compute servers requesting a job from said list of jobs and processing said separate image data files using multiprocessing;
    collating said processed separate image data files into a single imaging result on one of said plurality of compute servers, executing a voting scheme to select the output of one of said different classification methods as an optimal result; and
    interfacing with said single imaging result via a computer including a visual display and a user interface.

18. The method of claim 17, further comprising the steps of:
    said plurality of compute servers sending job status, history data and metadata to said central job database; and
    said central job database storing received job status, history data and metadata.

19. The method of claim 18, wherein said central job database comprises a relational database.

20. The method of claim 18, wherein said step of said plurality of compute servers requesting jobs from said list comprises the step of said plurality of compute servers requesting jobs from said list when they have capacity.

21. The method of claim 20, wherein said step of said plurality of compute servers requesting jobs from said list comprises the step of said plurality of compute servers requesting jobs from said list during specified times.

22. The method of claim 20, further comprising the step of said plurality of compute servers referring to a configuration file specifying the number of jobs which may be run, in determining whether they have capacity.

23. The method of claim 17, wherein said jobs comprise scripts.

24. The method of claim 23, further comprising the step of said scripts calling stored processing modules having a standard application programming interface (API).

25. The method of claim 24, further comprising the step of an interface generator operable translating the API and documentation to the particulars and syntax of a desired scripting language, allowing processing modules to be called from scripts written in different languages.

26. The method of claim 24, further comprising the step of said processing modules obtaining input data from local files, databases, memory objects or Web services.

27. The method of claim 17, wherein said network includes a local area network (LAN) and at least one of said plurality of compute servers is accessible via said LAN.

28. The method of claim 17, wherein said network includes an Internet network and at least one of said plurality of compute servers is accessible via the Internet.

29. The method of claim 17, further comprising the step of at least one of said plurality of compute servers processing said separate data files using specialized internal hardware.

30. The method of claim 28, wherein said specialized internal hardware comprises at least one device selected from the group consisting of multiple CPUs, one or more Graphical Processing Units, and a Cell processor.

31. The method of claim 28, wherein said step of processing said separate data files using multiprocessing, comprises the step of processing using symmetric multiple processing (SMP).

32. The method of claim 17, wherein said image database comprises a parallel virtual file system (PVFS).

33. The method of claim 17, wherein said voting scheme comprises selecting a most common output as the optimal result.

34. The method of claim 17, wherein said step of performing a different classification method comprises performing a classification method selected from the group consisting of maximum likelihood classification, neural networks, minimum distance, KNN and K-means.

35. The system of claim 1, wherein said voting scheme comprises selecting a most common output as the optimal result.

36. The system of claim 35, wherein said different classification methods are selected from the group consisting of maximum likelihood classification, neural networks, minimum distance, KNN and K-means.

* * * * *

UNITED STATES PATENT AND TRADEMARK OFFICE
CERTIFICATE OF CORRECTION

PATENT NO. : 8,768,104 B2
APPLICATION NO. : 12/349959
DATED : July 1, 2014
INVENTOR(S) : Moses et al.

Page 1 of 14

It is certified that error appears in the above-identified patent and that said Letters Patent is hereby corrected as shown below:

Title page, showing 36 Claims, 7 Drawing Sheets should be deleted and substitute therefore the attached title page showing 36 Claims, 12 Drawings Sheets.

In the Drawings

Drawing Sheets 1-7 of 7 should be deleted and substitute therefore the attached drawing sheets 1-12 of 12 to include Tables 1A, 1B, 1C, 1D and 1E as shown on the attached pages 5-9 of 14.

Signed and Sealed this
Twenty-fifth Day of November, 2014

Michelle K. Lee
*Deputy Director of the United States Patent and Trademark Office*

(12) United States Patent
Moses et al.

(10) Patent No.: US 8,768,104 B2
(45) Date of Patent: Jul. 1, 2014

(54) HIGH VOLUME EARTH OBSERVATION IMAGE PROCESSING

(75) Inventors: Robert Moses, Chelsea (CA); David Stanley, Ottawa (CA); Louis Burry, Ottawa (CA); Richard Pollock, Aurora (CA)

(73) Assignee: PCI Geomatics Enterprises Inc. (CA)

( * ) Notice: Subject to any disclaimer, the term of this patent is extended or adjusted under 35 U.S.C. 154(b) by 939 days.

(21) Appl. No.: 12/349,959

(22) Filed: Jan. 7, 2009

(65) Prior Publication Data
US 2009/0232349 A1    Sep. 17, 2009

(30) Foreign Application Priority Data
Jan. 8, 2008   (CA) ................................ 2617119

(51) Int. Cl.
G06K 9/00   (2006.01)
G06K 9/36   (2006.01)
G06K 9/54   (2006.01)
G06K 9/60   (2006.01)

(52) U.S. Cl.
USPC ...... 382/305; 382/100; 382/284; 707/E17.018

(58) Field of Classification Search
None
See application file for complete search history.

(56) References Cited

U.S. PATENT DOCUMENTS

| | | | |
|---|---|---|---|
| 6,107,961 A * | 8/2000 | Takagi | 342/357.64 |
| 6,125,329 A * | 9/2000 | Place et al. | 702/5 |
| 6,480,627 B1 * | 11/2002 | Mathias et al. | 382/224 |
| 6,711,594 B2 * | 3/2004 | Yano et al. | 1/1 |
| 7,154,538 B1 * | 12/2006 | Fukasawa et al. | 348/211.3 |
| 7,676,788 B1 * | 3/2010 | Ousterhout et al. | 717/106 |
| 8,472,664 B1 * | 6/2013 | Jing et al. | 382/100 |
| 2003/0051188 A1 * | 3/2003 | Patil | 714/4 |
| 2004/0103208 A1 * | 5/2004 | Chung et al. | 709/236 |
| 2004/0148390 A1 * | 7/2004 | Cleary et al. | 709/224 |
| 2004/0215659 A1 * | 10/2004 | Singfield et al. | 707/104.1 |
| 2005/0007625 A1 | 1/2005 | Garcia | 358/1.15 |
| 2005/0050292 A1 * | 3/2005 | Oh | 711/170 |
| 2005/0268300 A1 | 12/2005 | Lamb et al. | 718/100 |
| 2006/0031833 A1 * | 2/2006 | Huang et al. | 717/178 |
| 2006/0279628 A1 * | 12/2006 | Fleming | 348/143 |
| 2007/0076016 A1 * | 4/2007 | Agarwala et al. | 345/629 |
| 2008/0077560 A1 * | 3/2008 | Corni et al. | 707/3 |

(Continued)

OTHER PUBLICATIONS

Chinese Office Action issued in corresponding Chinese Patent Application Serial No. 200910003173.8 dated Mar. 22, 2012, with English translation (14 pgs).

(Continued)

*Primary Examiner* — Michelle Entezari
(74) *Attorney, Agent, or Firm* — Hayes Soloway P.C.

(57) ABSTRACT

The present invention is related to the processing of data, and more particularly to a method of and system for processing large volumes of Earth observation imagery data. A system for processing a large volume of Earth observation imaging data is described, comprising a computer including a visual display and a user interface, a plurality of servers, an image database storing said Earth observation imaging data as a plurality of separate image data files, and a network for interconnecting the computer, plurality of servers and image database. The plurality of servers is operable to process the separate data files in a distributed manner, at least one of the plurality of servers is operable to process the separate data files in a multiprocessing environment and at least one of the plurality of servers is operable to collate the processed separate data files into a single imaging result.

36 Claims, 12 Drawing Sheets

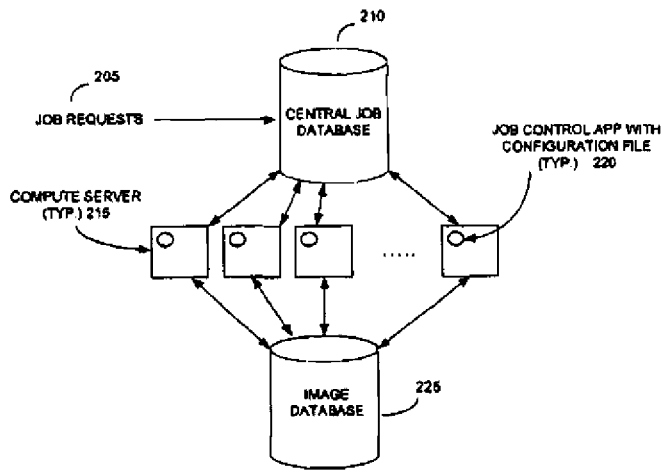

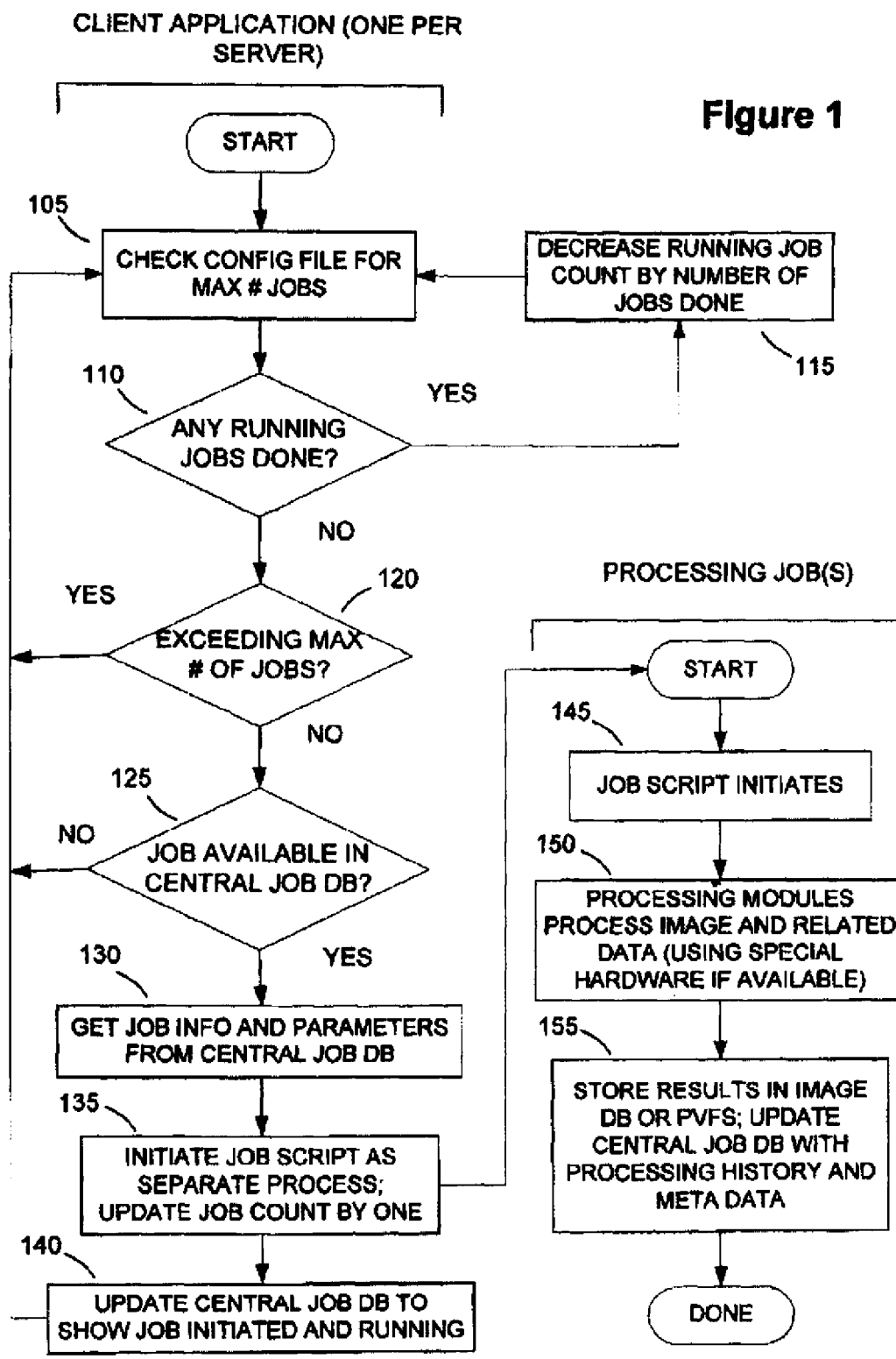

Table 1A

| NAME | DESCRIPTION |
|---|---|
| adem | Airphoto Automatic DEM Extraction |
| aepipro | Airphoto Epipolar Projection |
| ARI | Image Channel Arithmetic |
| ATCOR3 | Atmospheric Correction using Elevation Data |
| ATCOR3_T | Surface Temperature using Elevation Data |
| autochip | Automatic Chip Matching for GCP collection |
| avg | Unsupervised Texture Segmentation |
| cdeosat | CD EOSAT Fast Format |
| cdirss | CD IRS Super Structure Format |
| Cdland7 | CD LANDSAT 7 Format |
| cdlandb | CD TM Brazilian Format |
| cdsar | CD ERS/PALSAR/RADARSAT LGSOWG Format |
| cdsat | CD ERS/RADARSAT CCT Format |
| cdspot | CD SPOTIMAGE SPOT Format |
| chipext | Chip Extraction |
| chipmat | Chip Match |
| CIM | Create Image Database File |
| CLS | Cluster Definition Classification |
| context | Contextual Classification |
| CONTOUR | Contour Generation from DEM |
| CSG | Classifier Signature Generator |
| DECORR | Decorrelation Stretch |
| DIM | Delete Image Database File |
| DRAIN | Drainage Basin from Elevation Data |
| endmemb | Find a Set of Endmember Spectra |
| EXPORT2KML | Export to Google Earth KML or KMZ |
| FAV | Averaging (Mean) Filter |
| FED | Edge Detection Filter (up to 33x33) |
| fefrost | Enhanced Frost Filtering |
| felee | Enhanced Lee Adaptive Filtering |
| FERODEH | Erode Holes Filter (up to 1001x1001) |
| FEXPORT | Export To Foreign File |
| FFREQ | Frequency Domain Image Filter |
| ffrost | Frost Adaptive Filtering |
| fftmpoly | Extract GCPs by image-polygon matching. |
| fftmvec | Extract GCPs by image-vector matching. |
| FGA | Gaussian Filter (up to 33x33) |
| fgamma | Gamma Map Filtering |
| FIMPORT | Import Foreign File |
| fkuan | Kuan Filtering |
| fle | Lee Adaptive Filtering |

Table 1B

| NAME | DESCRIPTION |
| --- | --- |
| FME | Median Filter (up to 7x7) |
| FMO | Mode Filter (up to 7x7) |
| FPAR | Fraction of Absorbed Photosynthetically Radiation |
| FPR | Programmable Filter (up to 33x33) |
| FPRE | Prewitt Edge Filter (up to 33x33) |
| FRD2P | Reduction to Pole Filter |
| FSHARP | Sharpening Filter (up to 33x33) |
| FSOBEL | Sobel Edge Filter (up to 33x33) |
| Fspec | SAR Speckle Filtering |
| FTF | Frequency Transforms Forward |
| FTI | Frequency Transforms Inverse |
| Fusion | Data Fusion of Two Input Images |
| fuz | Unsupervised Fuzzy Clustering |
| FUZCLUS | Fuzzy K-Means Clustering |
| GCII | Image to Image GCP Collection |
| GCIM | Image to Map GCP Collection |
| GCIT | Image to Terminal GCP Collection |
| GCIV | Image to Vector GCP Collection |
| gcpelev GCP | Elevations from a DEM |
| gcppro GCP | Transformed by Projection |
| gcprefn GCP | Refinement |
| genclut | Generate a Spectral Line Curvature Correction LUT |
| genrlut | Generate an At-Sensor Radiance LUT |
| GRDINT | Vector Grid Interpolation |
| GRDPNT | Point Coverage Gridding |
| GRDPOL | Polygon Coverage Gridding |
| HIS | Histogramming Database Image |
| histex | Histogram-based Texture Measures |
| HMM | Histogram Migrating-Means Clustering |
| HOM | Homogeneous Area Classification |
| HSG | Histogram Signature Generation |
| i2sp | Output Band Vectors as Image Spectra |
| idint | Inverse Distance Interpolation |
| IHS | RGB to IHS Conversion |
| IIBIT | Database Image Transfer Under Bitmap |
| Imerge | Merge Image Files |
| IND | Index Analysis |
| IPG | Image Polygon Growing |
| ISOCLUS | Isodata Clustering |

Table 1C

| NAME | DESCRIPTION |
| --- | --- |
| KCLUS | K-Means Clustering |
| KNN | K-Nearest Neigbour Classification |
| KRIGING | Point Interpolation Using Kriging |
| LAI | Leaf Area Index Model |
| LRP | Image Line Replacement |
| LUT | Image Enhancement via Lookup Table |
| mal | Mallat Wavelet Transformation |
| MASKING | Calculate Haze and Cloud Mask |
| MAT | Matrix Analysis |
| MATCH | Histogram Matching LUT |
| METASET | Set a Metadata Value |
| MINDIS | Minimum Distance Classifier |
| MLC | Maximum Likelihood Classifier |
| Mnfnr | Max. Noise Fraction Based Noise Removal |
| MODEL | Modelling Program |
| MOSAIC | Image Mosaicking |
| MTE | Martin-Taylor Transformation |
| NDVI | Compute NDVI from AVHRR Data |
| NGCLUS2 | N-bit Narendra-Goldberg Clustering |
| nnclass | Neural Network Classification |
| nnint | Natural Neigbour Interpolation |
| Nntrain | Neural Network Training |
| ORARASLOAD | Export Raster To ORACLE DATABASE |
| ORAVECLOAD | Export vectors To ORACLE DATABASE |
| ortho | Orthorectification |
| OVL | Overlay Analysis |
| PCA | Principal Component Analysis |
| Pansharp | Pan sharpen an Image |
| PRX | Proximity Analysis |
| Psboxcar | POLSAR Boxcar Filter |
| Pscc | Corr. Coeff. for Two POLSAR Elements |
| psclopot | Cloude-Pottier Classification |
| pseaba | Entropy, A-angle, B-angle, and Anisotropy |
| psfredur | Freeman-Durden Unsup. Classification |
| PSG | Perspective Scene Generation |
| Psinang | Incident Angle Map |
| Psinten | POLSAR Element Intensity |
| psintrat | Intensity Ratio of Two POLSAR Elements |
| pspedht | Polarization Response Pedestal Height |
| Psphdiff | Phase Difference of POLSAR Elements |

Table 1D

| NAME | DESCRIPTION |
| --- | --- |
| Pspoldis | Polarimetric Discriminators |
| pspolfil | POLSAR Speckle Filter |
| pspolsyn | General POLSAR Backscatter Synthesis |
| Pspolsync | Contrast Maximized Backscat. Synthesis |
| pspolsynr | Target Maximized Backscatter Synthesis |
| pssscm | Symmetric Scattering Charact. Method |
| psswis | Supervised Wishart Classification |
| Pstotpow | Total Power |
| psuswis | Unsupervised Wishart Classification |
| psvanzyl | Unsupervised van Zyl Classification |
| pswhite | Whitening Filter Target Detection |
| Pyramid | Build Image Overview Pyramids |
| rbfint | Radial Basis Function Interpolation |
| regpro | Image Registration and Projection |
| REL | Shaded Relief from Elevation Data |
| rsdem | Radarsat Automatic DEM Extract |
| rstr | SAR Image Contrast Stretch |
| Rtcsigm | SAR Backscatter with Terrain Correction |
| RTV | Raster to Vector Conversion |
| sam | Spectral Angle Mapper |
| Sarbeta | Generate Radar Brightness |
| Sarclass | Classify Segmented SAR image |
| sarincd | SAR Incidence Angle Estimation |
| sarseg | Segment Single Channel SAR image |
| sarsigm | Generate Radar Backscatter |
| sartex | SAR-specific Texture Measures |
| SAVI | Soil Adjust Vegetation Index |
| sdem | Satellite Automatic DEM Extract |
| SEED | Automatic Watershed Seed Starter |
| Sepipro | Satellite Epipolor Projection |
| shftcw | Shift Centre Wavelength Values |
| SHRINK | Shrink Areas in Theme Channel |
| sieve | Sieve Filter (Class Merging) |
| SIGJPL | Display Polarization Signature |
| SIGMERG | Classifier Signature Merging |
| SIGSEP | Classifier Signature Separability |
| slc2img | Convert SLC to Image |
| slccor | Apply a Spectral Line Curvature Correction LUT |
| SLP | Slope of Elevation Data |
| smodel | Satellite Model Calculation |
| smspec | Smooth Spectra |

Table 1E

| NAME | DESCRIPTION |
|---|---|
| smodel | Satellite Model Calculation |
| smspec | Smooth Spectra |
| solarzaz | Solar-zenith and Solar-azimuth Calculator |
| sortho | Satellite Image Orthorecification |
| sp2rt | Convert a Spectrum to a Rad. Trans. |
| spadd | Spectrum Record Addition |
| spbanal | Spectral Band Analysis |
| spconv | High to Low Resolution Spectral Convolution |
| spconvf | High-to-Low Filter Convolution of Spectrum |
| spconvg | High-to-Low Gaussian Convolution of Spectrum |
| spconvp | Convolve Spectra With Response Profiles |
| spfit | Fit Spectrum to Reference Spectrum |
| Spfunc | Spectral Algabraic and Trig Functions |
| sphull | Create Segmented Upper Hull Continuum |
| spimari | Spectrum Image Arithmetic Operations |
| spmod | Spectrum Library Record Modification |
| spnorm | Spectrum Normalization |
| Spunmix | Spectral Linear Unmixing |
| srortho | Satellite Radar Image Ortho. |
| srtogr | Slant Range to Ground Range Conversion |
| SST | Sea Surface Temperature from AVHRR Data |
| strpcor | Stripe Correction |
| SYNTH | Synthesize Arbitrary Polarization Image |
| tex | Texture Analysis |
| THR | Thresholding Image to Bitmap |
| VDEMINT | Grid DEM from Vector Layers |
| VECREG | Vector Registration (Warping) |
| video | Digital/Video Camera Parameters |
| WTRSHED | Watersheds from Elevation Data |